US006801483B2

United States Patent
Hong et al.

(10) Patent No.: US 6,801,483 B2
(45) Date of Patent: Oct. 5, 2004

(54) OPTICAL PICKUP ACTUATOR PERFORMABLE TILTING OPERATION

(75) Inventors: Sam Nyol Hong, Suwon (KR); Min Suk Suh, Sungnam (KR); In Ho Choi, Sunganam (KR)

(73) Assignee: LG Electronics Inc., Seoul (KR)

( * ) Notice: Subject to any disclaimer, the term of this patent is extended or adjusted under 35 U.S.C. 154(b) by 367 days.

(21) Appl. No.: 09/903,655

(22) Filed: Jul. 13, 2001

(65) Prior Publication Data

US 2002/0021651 A1 Feb. 21, 2002

(30) Foreign Application Priority Data

Jul. 13, 2000 (KR) .......................................... 2000-40275
Sep. 25, 2000 (KR) .......................................... 2000-52002
Nov. 8, 2000 (KR) .......................................... 2000-68695

(51) Int. Cl.[7] ................................................ G11B 7/00
(52) U.S. Cl. ................................. 369/44.15; 369/44.16
(58) Field of Search ........................ 369/44.14, 44.15, 369/44.16, 112.23; 359/814, 813, 823, 824, 821

(56) References Cited

U.S. PATENT DOCUMENTS 4,811,320 A * 3/1989 Kawasaki et al. ....... 369/44.15
5,046,820 A * 9/1991 Saekusa et al. ............. 359/814
5,898,652 A * 4/1999 Makigaki et al. ........ 369/44.16

* cited by examiner

Primary Examiner—Paul W. Huber
(74) Attorney, Agent, or Firm—Birch, Stewart, Kolasch & Birch, LLP

(57) ABSTRACT

In an optical pickup actuator performable a tilting operation which operates an object lens so as to follow the center of signal tracks of an optical disc, an optical pickup actuator performable a tilting operation includes a plurality of damper holders separately fixed to both sides of a base, a lens holder placed between the plurality of damper holders and having an object lens for reading and writing information on a disc, suspension support means separately connected between both sides of the lens holder and the plurality of damper holders so as to support the lens holder as two sides one-stage support structure, and magnetic operating means separately installed at the lens holder and the base and operating the lens holder so as to follow an optical disc, accordingly an optical pickup actuator performable a tilting operation in accordance with the present invention can perform not only a translational motion in a tracking direction and a focusing direction but also a tilting motion in a radial direction and a tangential direction by minimizing a constraining force about the lens holder, thus data recorded on a high density disc can be accessed more accurately.

13 Claims, 25 Drawing Sheets

FIG. 28.B

OPTICAL PICKUP ACTUATOR PERFORMABLE TILTING OPERATION

BACKGROUND OF THE INVENTION

1. Field of the Invention

The present invention relates to an optical pickup apparatus recording information on an optical disc or reproducing information recorded on an optical disc.

2. Description of the Prior Art

Recently, according to rapid development of disc mediums in relation to the optics, various optical pickup apparatus for recording/reproducing information onto/recorded on an optical disc are being developed.

Generally, an optical pickup apparatus includes an optical pickup actuator operating an objective lens in order to make an optical spot of an optical beam of the objective lens follow the center of signal tracks of an optical disc against a surface vibration and an eccentricity, etc. due to rotation of the optical disc.

The optical pickup actuator controls the objective lens so as to perform a focusing operation and a tracking operation.

Herein, the focusing operation means operating the objective lens up and down in order to make an optical spot of an optical beam of the objective lens place within a depth of focus, and the tracking operation means operating the objective lens right and left in order to make an optical spot of an optical beam of the objective lens follow the center of signal tracks of an optical disc.

In more detail, corresponding to an optical pickup, a position of a disc track can be varied relatively by an error and deformation in a manufacture process, a vibration due to rotation of the optical disc and an error of the optical pickup itself, etc., in order to compensate the variation of the position of the disc track an object lens is operated by an optical pickup actuator with electric signals The optical pickup actuator operates the object lens by an electromagnetic force generating between a current of a coil and a magnet by using the coil and the magnet.

FIG. 1A is a plan view illustrating an optical pickup actuator in accordance with the prior art, and FIG. 1B is a front view illustrating the optical pickup actuator in accordance with the prior art.

The optical pickup actuator in accordance with the prior art includes an objective lens 101 at the center portion, a lens holder 102 having coils 105, 106 on a circumference for tracking and focusing operations, a plurality of magnets 103 and a plurality of yokes 104 separately installed at both sides of the lens holder 102 in order to construct a magnetic circuit, a plurality of suspension wires 107 separately fixed to a plurality of protrusion portions 108 of the lens holder 102 in order to support the lens holder 102, and a damper holder 109 fixed to a base 100 and fixing the other end of each of the plurality of suspension wires 107.

Herein, a focusing coil 105 is wound on the circumference of the lens holder 102 in order to perform the focusing operation, and a tracking coil 106 is wound on each corner portion.

Each of the plurality of yokes 104 made with a ferromagnetic material and projected from the base 100 is placed on the right side or the left side of the lens holder 102, each of the plurality of magnets 103 is fixed inside each yoke 104.

The plurality of protrusion portions 108 are formed at the center portion of the front and the rear surfaces of the lens holder 102, an end of each suspension wire 107 having a two-stage structure is brazed on each protrusion portion 108, the other end of each suspension wire 107 is connected to a PCB 120 through the damper holder 109.

Herein, a damper (not shown) is placed inside the damper holder 109 in order to give an attenuation characteristic to the suspension wires 107 having a stiffness, the PCB 120 is coupled to the rear of damper holder 109, and the other end of each suspension wire 107 is brazed and fixed to the PCB 120.

The plurality of suspension wires 107 support the lens holder 102 so as to be in a lifting state and transmit an operating signal from the PCB 120 to the focusing coil 105, the tracking 106.

The operation of the optical pickup actuator in accordance with the prior art will now be described.

Because the tracking coil 106 is wound on the lens holder 102 in a certain direction, it generates a magnetic flux in a designated direction when a current flows, the magnetic flux generates an attractive force and a repulsive force by the fixed magnets 103 and an electromagnetic force generated between the tracking coil 106 and the magnets 103.

Herein, as depicted in FIG. 1A, a tracking servo for compensating a tracking error is operated by moving the lens holder 102 back and forth by the attractive force and the repulsive force.

And, being different from the tracking coil 105, because the focusing coil 106 is wound in a vertical direction, a magnetic flux of the focusing coil 106 is generated in up and down directions and generates a power in a vertical direction by electric-magnetically working with a magnetic flux of each magnet 103, accordingly the lens holder 102 moves up and down as the focusing direction, and the focusing servo operates in order to compensate it.

In a moving coil method, the focusing coil 105 and the tracking coil 06 are installed at the circumference of the lens holder 102 and move to a tracking and a focusing directions according to the lens holder 102. On the contrary, in a moving magnet method, a magnet is installed at the circumference of a lens holder and moves according to the lens holder. Herein, both methods use a Lorentz power of Fleming's left-hand rule.

In the meantime, in a high density disc, because data to be recorded by a unit length of a track increases and the number of tracks increases, a control for reading and writing information on a high density disc can not be performed sufficiently in the conventional actuator as depicted in FIG. 1.

In more detail, as depicted in (a) and (b) of FIG. 2, under the circumstances of a width of a track formed at a disc 110 and a distance from a present track to a next track in accordance with the conventional recording density, it is possible to access data sequentially with movement of a pickup and the lens holder 102 of an actuator.

However, as depicted in (c) and (d) of FIG. 2, in a disc 110' having a high density format, the conventional optical pickup actuator can not access data accurately.

In order to solve above-mentioned problem, as depicted in FIG. 3, if the lens holder 102 of the actuator performs a tilt operation in a tangential direction and a radial direction on the disc 110' having the high density format, data can be accessed more accurately.

As depicted in FIG. 4, a tilt component has to be compensated in order to get a laser beam reflected through a reflector 111 be incident on a plane of reflection of the optical disc 110 by an objective lens 101.

However, in order to compensate the tilt component by an operation method of the lens holder, the actuator has to perform not only a translational motion in a tracking direction and a focusing direction but also a tilting motion in a radial direction (X axis rotation mode) and a tangential direction (Y axis rotation mode), it is impossible to perform the tilt motion in the conventional actuator.

Although the lens holder can perform the tilting motion by changing the magnetic field structure (depicted in FIG. 1), a degree of freedom of each of the two-stage suspension wires installed at both sides of the lens holder lowers.

For example, when the actuator operates as a pitching mode as depicted in FIG. 5, it has a resonance frequency (f0) of 2~5 KHz as depicted in FIG. 6, there is a problem to get an operating sensitivity.

In more detail, because a resonance frequency of a pitching mode as a rotation mode in a tangential direction is not less than 2 Khz due to a big spring constant of the suspension wire for performing the tilting motion in the tangential direction, it is impossible to perform the tilting motion in the tangential direction and get the operating sensitivity.

Herein, as depicted in FIG. 7, in an optical pickup actuator, when the suspension wire 107' having an one-stage structure supports the lens holder 102' only at one direction, because a tilting angle occurs always in the focusing motion or the tracking motion, although the actuator is capable of performing a tilting control using the servo, excessive loads occur in the optical pickup actuator.

In the meantime, as depicted in FIG. 8, an actuator support structure according to U.S. Pat. No. 4,811,320 (by SANYO ELECTRIC Co., Ltd., Moriguchi, Japan) will now be described.

In the conventional cantilever type support apparatus depicted in FIG. 1, when a thickness of the suspension wire 107 supporting the lens holder 102 increases, a bending characteristic of the suspension wire 107 is deteriorated and an inherence resonance frequency of the suspension wire 107 heightens, when the lens holder 102 performs the tracking motion or the focusing motion, a support point of the lens holder 102 is concentrated on a certain side of the lens holder 102, accordingly a rolling operation of the lens holder 102 is caused.

The above-mentioned rolling operation of the lens holder 102 was not desirable at the time of application of the U.S. Pat. No. 4,811,329, in order to consist a gravity center of the lens holder with an operation center point of the tracking motion or the focusing motion, SANYO ELECTRIC Co., Ltd. has suggested an actuator support structure as depicted in FIG. 8.

As depicted in FIG. 8, in the actuator support structure according to U.S. Pat. No. 4,811,320, four pairs (i.e., there are the total of 8 pairs when the opposite surface is included) of wires 13, 16 fabricated with the same material and having a different length are placed at side surfaces of the lens holder 1, each two pairs are separately placed at the lower portion and the upper portion of both side surfaces of the lens holder 1.

In more detail, in the patent, the total of eight pairs of wires 13, 16, namely each four pairs of wires 13, 16 are separately placed on each of two flat surfaces parallel to each other.

Herein, in the optical pickup actuator, the support structure of the lens holder can be arbitrarily classified into a two sides support structure forming a support member on both sides of a lens holder, an one side support structure forming a support member on one side of a lens holder, and a two-stage support structure forming separately each of two support members on a upper side portion and a lower side portion of a lens holder. In this classification, the conventional support structure depicted in FIG. 1 is an one side support structure and a two-stage support structure, and the support structure according to U.S. Pat. No. 4,811,320 is a two sides support structure and a two-stage support structure.

Meanwhile, in a two sides two-stage support structure suggested in U.S. Pat. No. 4,811,320, a tilting operation can not be performed, however a tilting operation can be performed in a two sides one-stage support structure in accordance with the present invention.

Because a two sides two-stage support structure according to U.S. Pat. No. 4,811,320 has been suggested in order to restrain unnecessary tilting operation of a lens holder at an extension of an one side two-stage support structure performing the conventional focusing and tracking operations, it is difficult to perform a tilting operation in an optical pickup actuator adopting the two sides two-stage support structure according to U.S. Pat. No. 4,811,320.

SUMMARY OF THE INVENTION

In order to solve above-mentioned problem, it is an object of the present invention to provide an optical pickup actuator performable a tilting operation which is capable of accessing data recorded on a high density disc more accurately by performing not only a translational motion in a tracking direction and a focusing direction but also a tilting motion in a radial direction and a tangential direction by installing a plurality of one-stage suspension support means on both sides of a lens holder so as to have an elasticity in order to minimize a constraining force about the lens holder.

In order to achieve above-mentioned object, there is provided an optical pickup actuator performable a tilting operation including two damper holders separately fixed to both sides of a base, a lens holder placed between the damper holders and having an object lens in order to read and write information of an optical disc, two suspension support means separately connected to the damper holder at both sides of the lens holder so as to support the lens holder as a two sides one-stage support structure, and two magnetic operating means separately installed at the lens holder and the base and operating the lens holder so as to follow an optical disc.

Two of the suspension support means are placed on a flat surface so as to be parallel each other.

In an embodiment of the present invention, the suspension support means is constructed with four suspension wires separately connected from the rear and the front of the lens holder to each of both damper holders.

A flexible PCB is placed at the outside of the damper holder in order to an operating signal to the magnetic operating means, its center portion is fixed to the damper holder so as to have a certain distance from the damper holder in order to transmit an operation signal to the magnetic operating means, and the suspension support means are connected to the front and the rear of the flexible PCB by passing through the damper holder so as to be supplied an elasticity.

In another embodiment of the present invention, the suspension support means are constructed with four suspension wires separately connected from both sides of the front and the rear of the lens holder to both damper holders.

In still another embodiment of the present invention, one end of each of the suspension support means is fixed to the one damper holder and the other end of each of the suspension support means is supported by the other damper holder so as to be movable in a length direction.

In yet another embodiment of the present invention, each of the suspension support means has an elastic portion in order to generate an elasticity by varying a length of the elastic portion.

Each suspension support means is constructed with a plate spring, and the elastic portion has a 'S' shape.

BRIEF DESCRIPTION OF THE DRAWINGS

FIG. 16 illustrates motion modes of a lens holder of an optical pickup actuator performable a tilting operation in accordance with a first embodiment of the present invention;

wherein

FIGS. 28A and 28B are front views illustrating a tilting motion in a tangential direction of the lens holder in the sixth embodiment of the present invention.

DETAILED DESCRIPTION OF THE PREFERRED EMBODIMENT

Hereinafter, an optical pickup actuator performable a tilting operation in accordance with embodiments of the present invention will now be described with reference to accompanying drawings.

Figure 14:
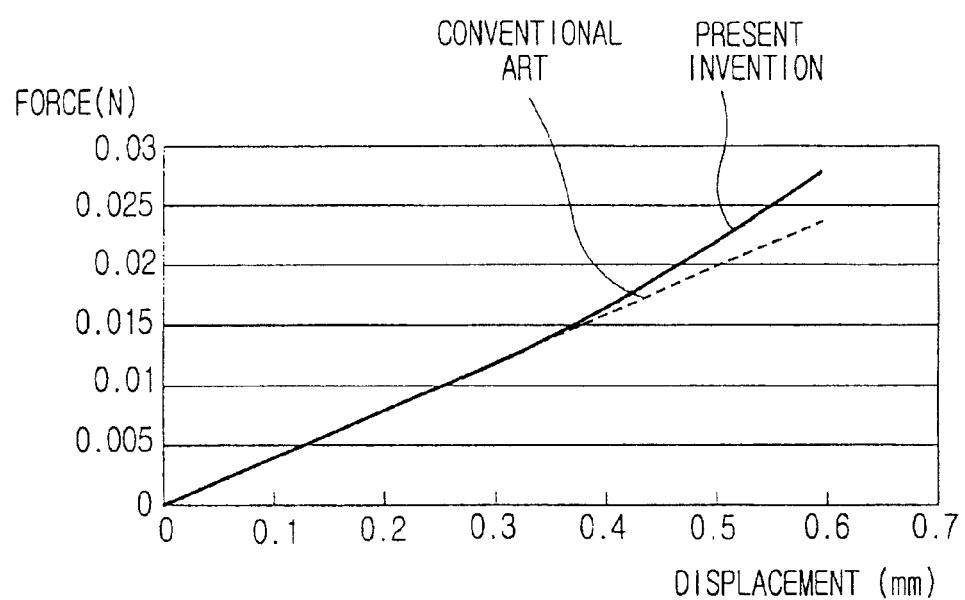
FIG. 14 is a graph illustrating a nonlinearity due to an elasticity of a flexible PCB in an optical pickup actuator performable a tilting operation in accordance with a first embodiment of the present invention.

An optical pickup actuator performable a tilting operation in accordance with a first embodiment of the present invention will now be described with reference to accompanying FIGS. 9 and 14.

Figure 1A:
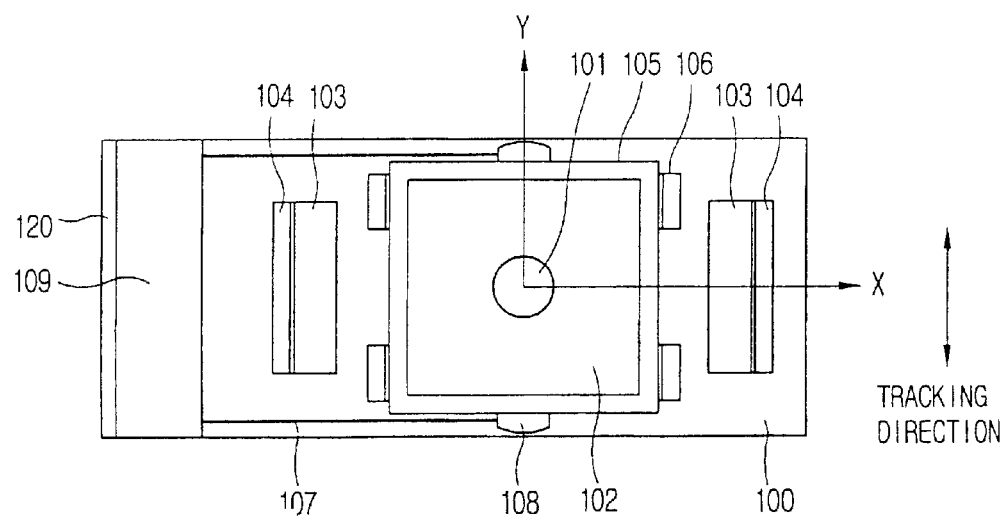
FIG. 1A is a plan view illustrating an optical pickup actuator having an one side and two-stage support structure in accordance with the prior art.
Figure 1B:
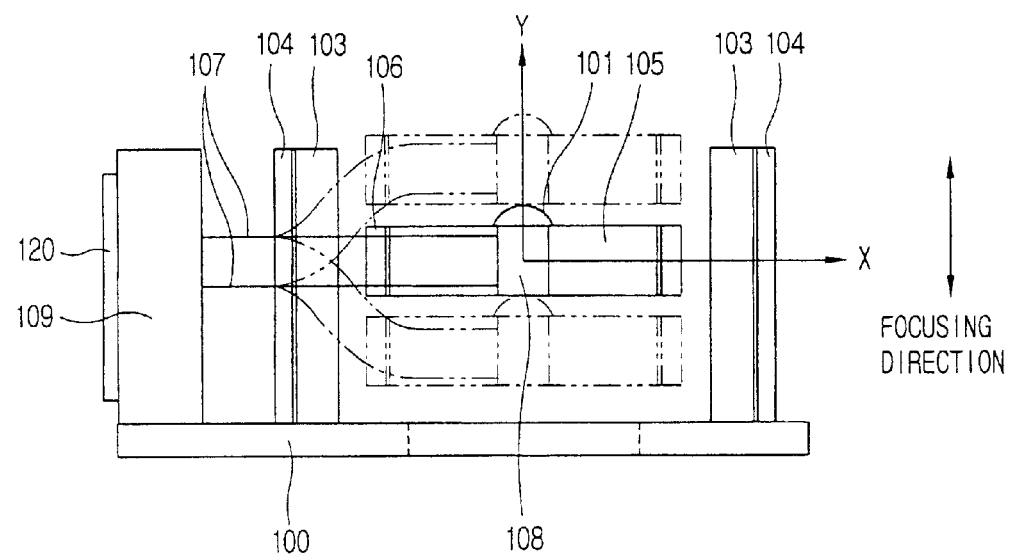
FIG. 1B is a front view illustrating an one side and two-stage support type optical pickup actuator in accordance with the prior art.
Figure 2:
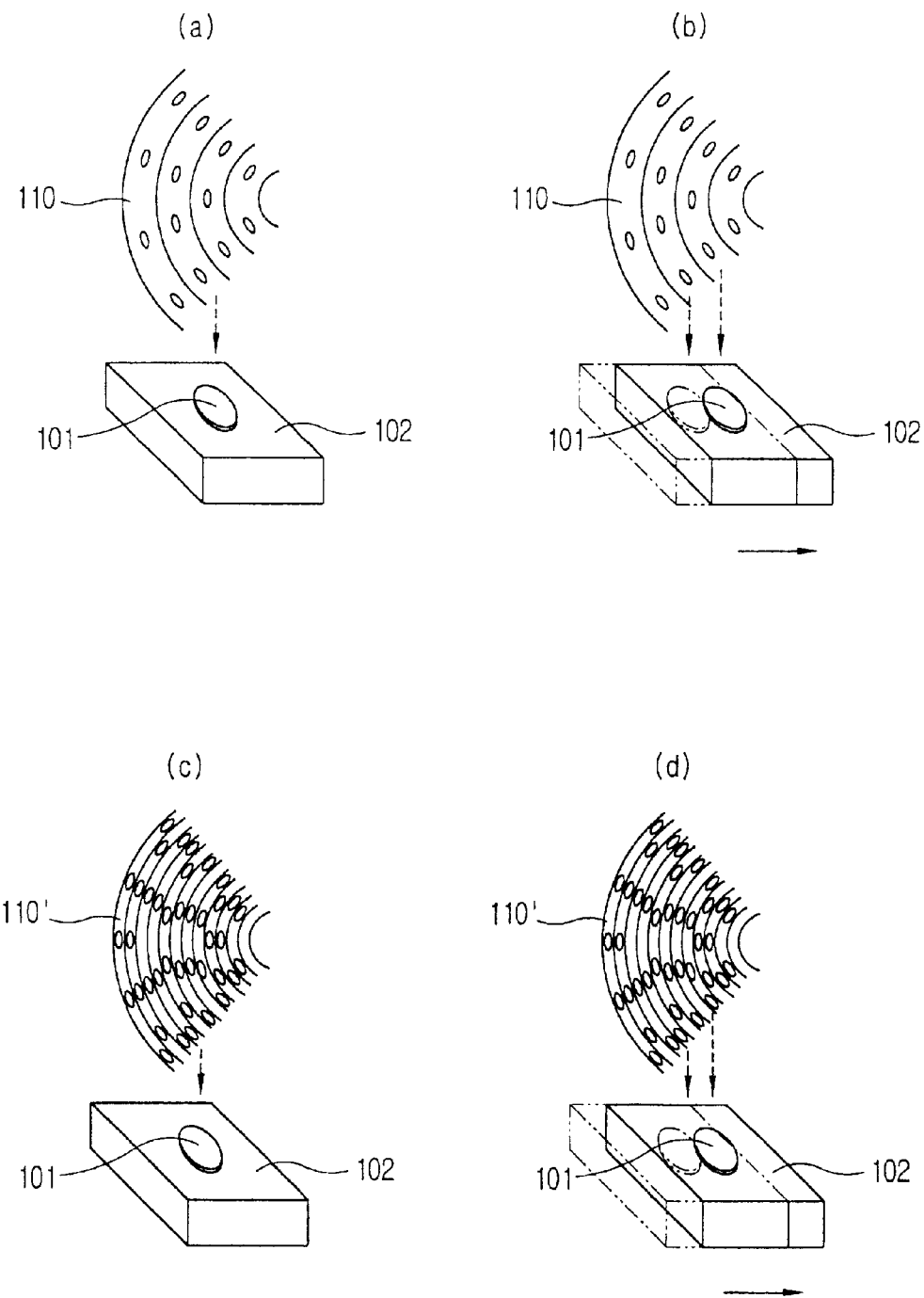
FIG. 2 is a reference view for describing increase of difficulties in data access as the heightening of a density of disc in an optical pickup actuator having an one side and two-stage support structure in accordance with the prior art.
Figure 3:
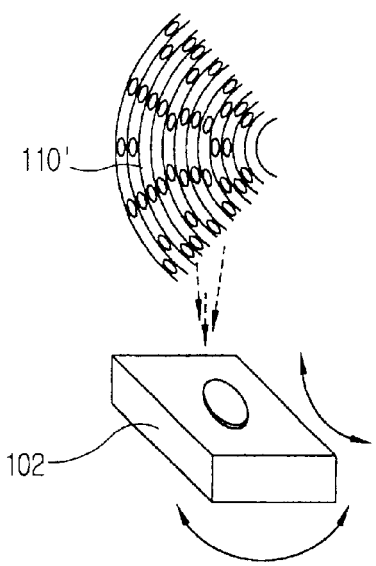
FIG. 3 is a reference view for describing accessing a high density disc by tilting an angle of a lens holder of an optical pickup actuator.
Figure 4:
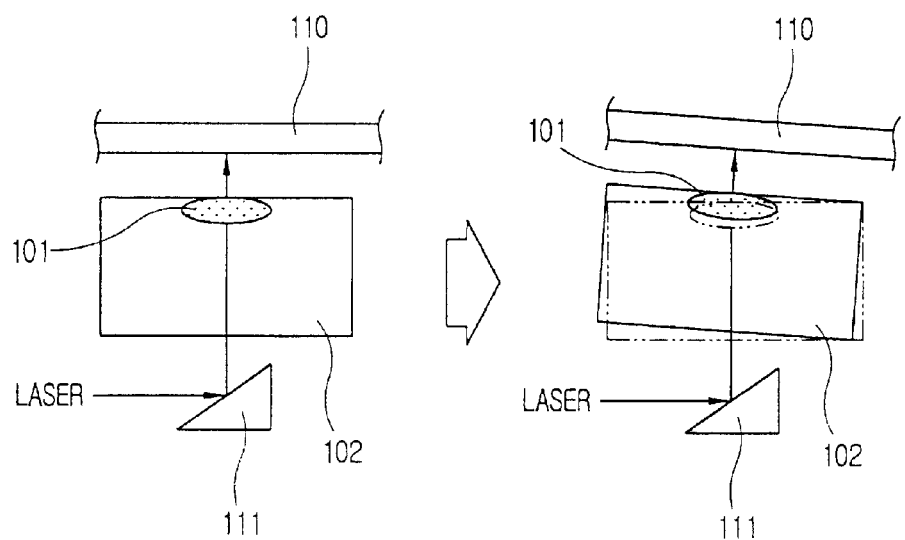
FIG. 4 is a perspective view illustrating compensating a tilt angle in an optical pickup actuator.
Figure 5:
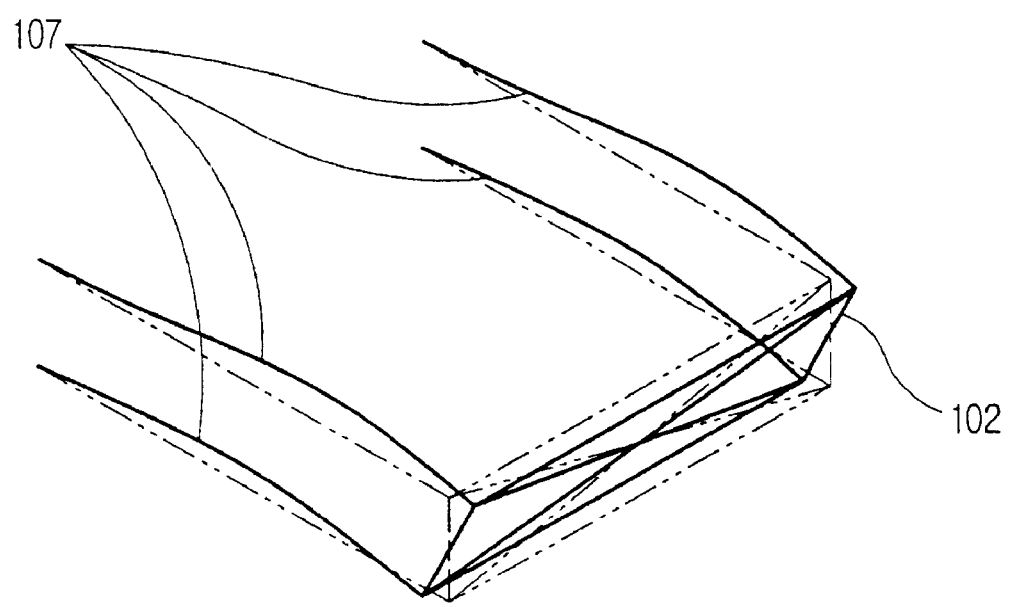
FIG. 5 illustrates a simulation of a pitching mode of an optical pickup actuator.
Figure 6A:
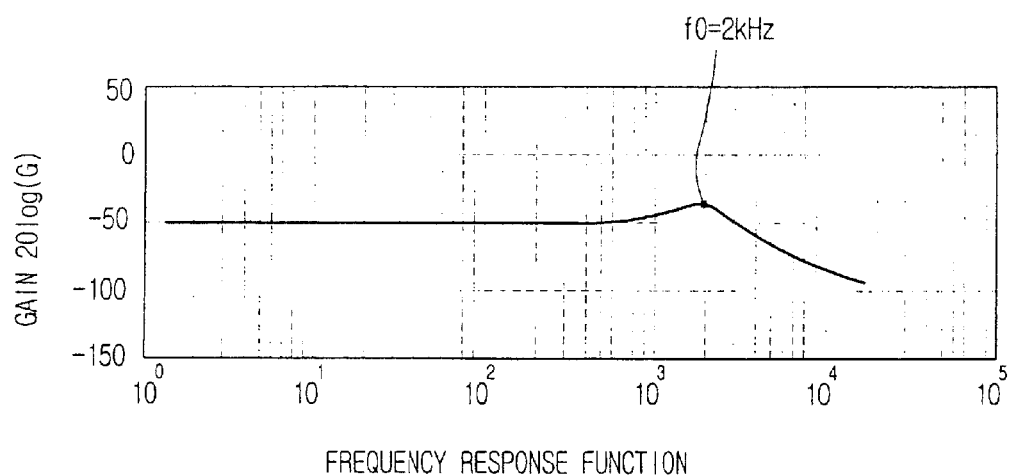
FIG. 6 is a graph illustrating a sensitivity characteristic according to variation of a pitching resonance frequency in an optical pickup actuator in accordance with the prior art.
Figure 6B:
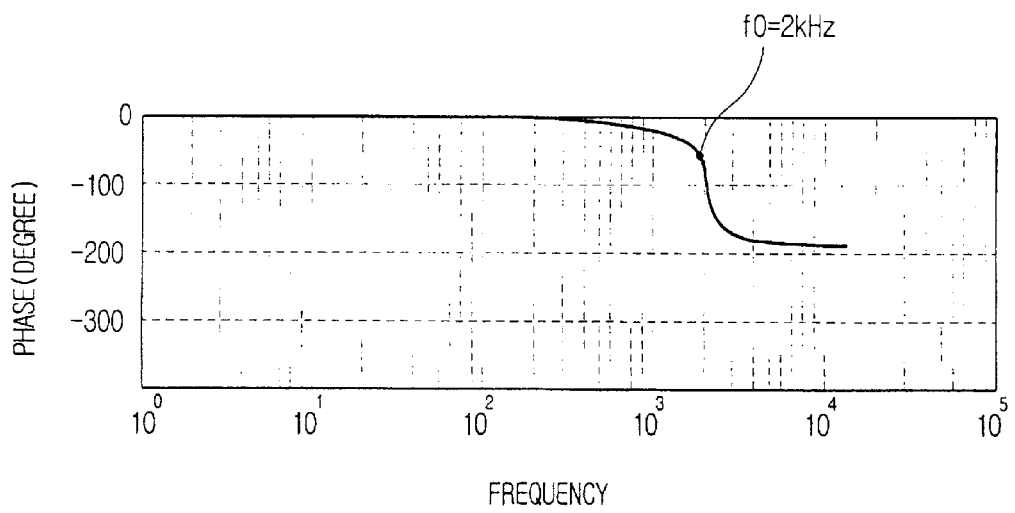
Figure 7:
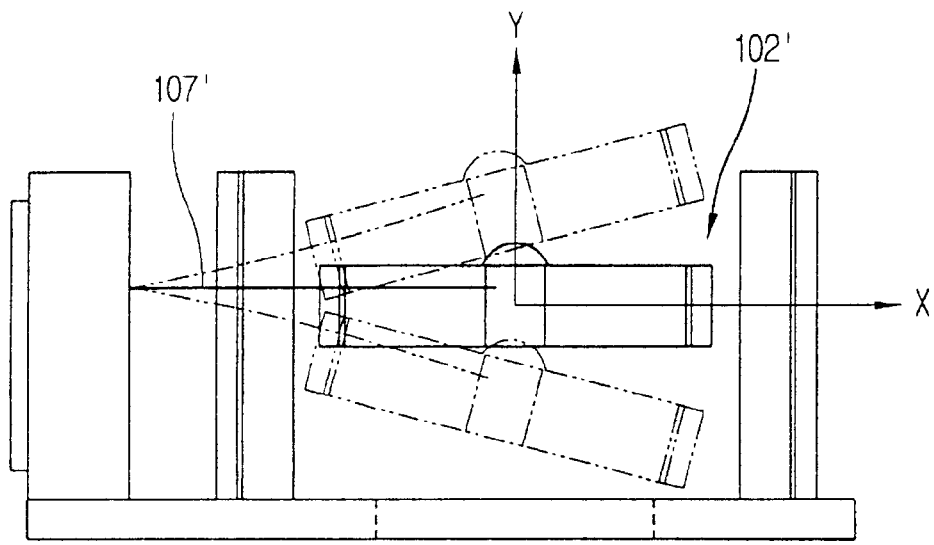
FIG. 7 is a front view illustrating an optical pickup actuator having an one side and one-stage support structure in accordance with the prior art in order to describe a tilting operation-coupled phenomenon in a focusing operation.
Figure 8:
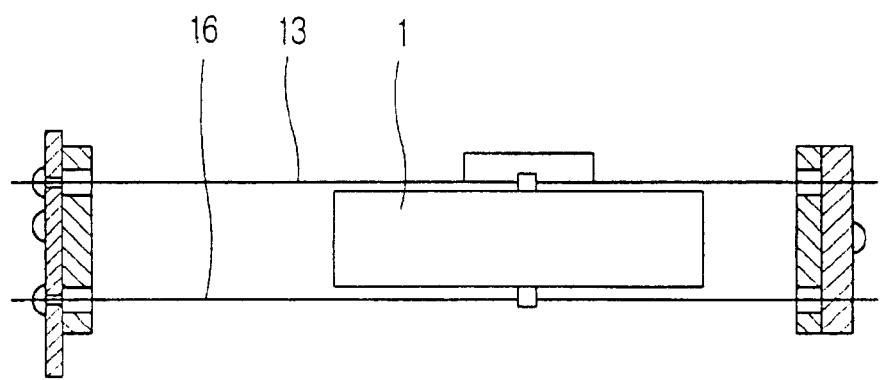
FIG. 8 is a reference view illustrating the conventional one side and two-stage support structure according to U.S. Pat. No. 4,811,320.
Figure 9A:
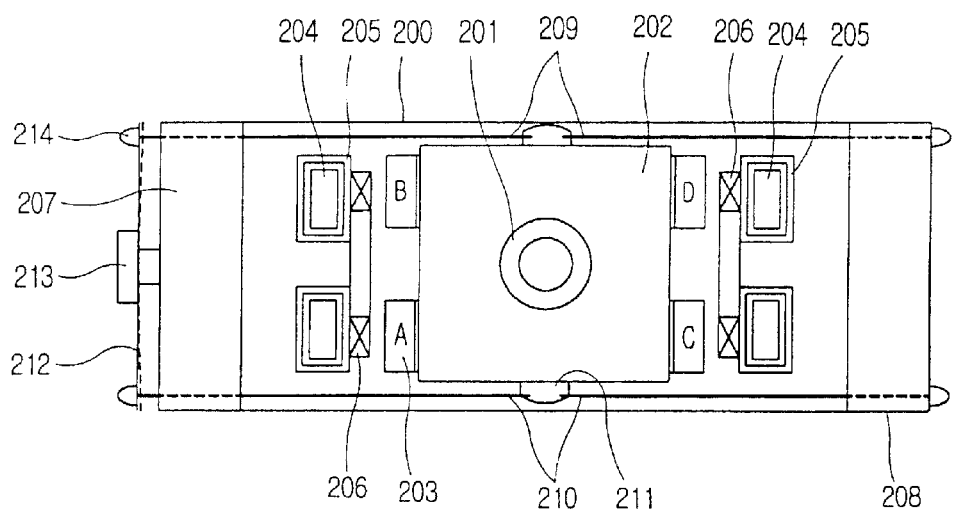
FIG. 9A is a plan view illustrating an optical pickup actuator performable a tilting operation in accordance with a first embodiment of the present invention.
Figure 9B:
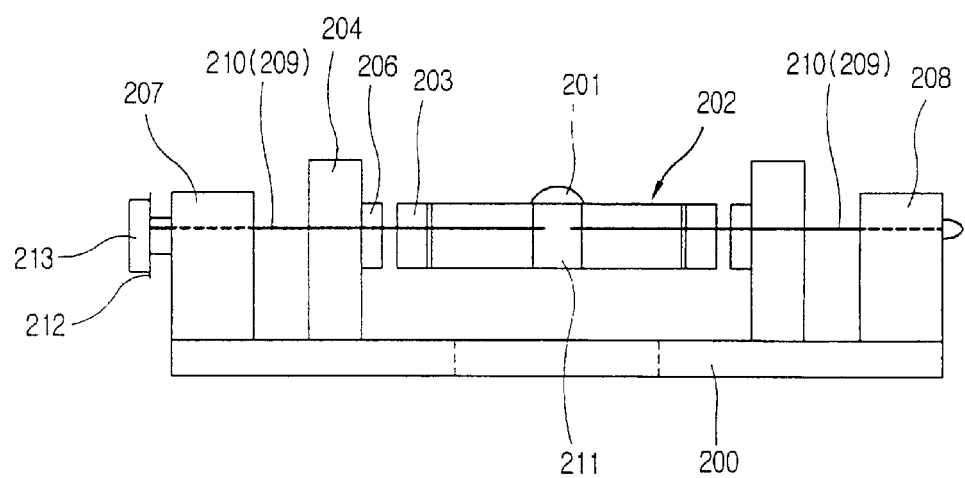
FIG. 9B is a front view illustrating an optical pickup actuator performable a tilting operation in accordance with a first embodiment of the present invention.
Figure 10:
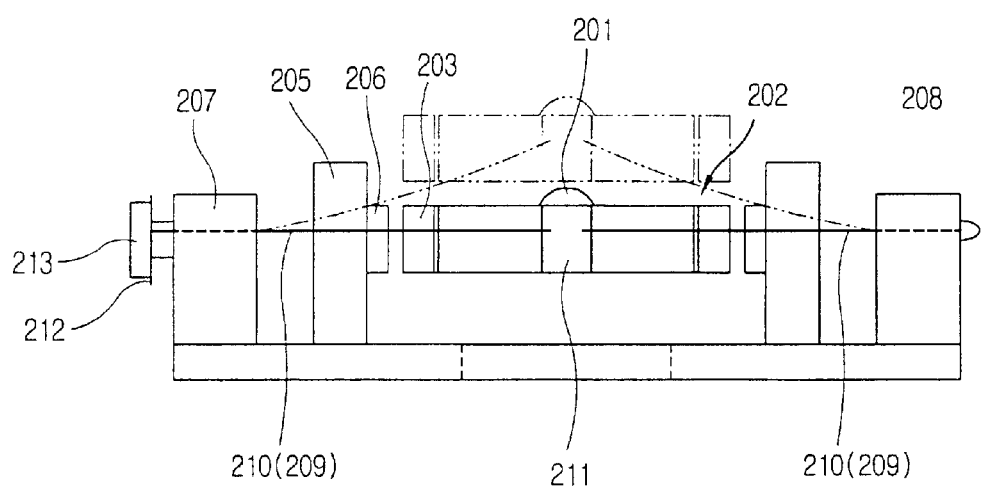
FIG. 10 is a front view illustrating a focusing operation of an optical pickup actuator performable a tilting operation in accordance with a first embodiment of the present invention.

FIG. 9A is a plan view and FIG. 9B is a front view illustrating the optical pickup actuator performable the tilting operation in accordance with the first embodiment of the present invention.

The optical pickup actuator performable the tilting operation in accordance with the first embodiment of the present invention includes a lens holder 202 having an object lens 201 at the center portion and a plurality of magnets 203 on the right and the left side surfaces, a plurality of yokes 204 fixed to a base 200, wound a tracking coil 205 for performing a tracking and a focusing coil 206 for performing a focusing, a plurality of damper holders 207, 208 separately fixed to both sides of the base 200, and four suspense wires 209, 210 separately connected to the front and the rear of the lens holder 202.

In more detail, the damper holders 207, 208 separately installed at the right and the left portions of the lens holder 202 so as to correspond each other, four suspension wires 209, 210 are connected to each of the damper holders 207, 208 at the front and the rear of the lens holder 202 so as to support the lens holder 202.

And, a flexible PCB 212 is fixed to the damper holder 207 by fastening a screw so as to have a certain distance from the damper holder 207, and two of the suspension wires 209, 210 are separately connected to the flexible PCB 212.

The construction and operation of the optical pickup actuator performable the tilting operation in accordance with the first embodiment of the present invention will now be described in detail.

The object lens is placed at the center portion of the lens holder 202, four magnets 203 are separately installed at the right side and the left side of the lens holder 202.

The tracking coil 205 and the focusing coil 206 are separately wound and installed on the plurality of yokes 204 placed at the right and the left portions of the lens holder 202 so as to correspond to the plurality of magnets 203.

In each of the plurality of suspension wires 209, 210, one end is fixed to the center portion of the front or the rear of the lens holder 202, and the other end is fixed to the base 200 by a brazing, etc. through the damper holders 207, 208. Herein, a damper (not shown) having an attenuation characteristic is combined inside the damper holders 207, 208.

In the optical pickup actuator performable the tilting operation in accordance with the first embodiment of the present invention, when a current flows to each tracking coil 205 installed at each yoke 204, a magnetic flux is generated in a designated direction. Herein, a Lorentz Force is generated by an electromagnetic force between the plurality of magnets 203 fixed to the lens holder 202.

In addition, when a current intensity of each of the focusing coil 206 on the left of the lens holder 202 is different from a current intensity of each of the focusing coil 206 on the right side of the lens holder 202, the lens holder 202 moves in a Radial direction, when a current intensity of each focusing coil 206 on the right and the left of the rear of the lens holder 202 is different from a current intensity of each focusing coil 206 on the right and the left of the front of the lens holder 202, the lens holder 202 moves in a Tangential direction.

Herein, each pair of the suspension wires 209, 210 is separately placed at the front and the rear of the lens holder 202 so as to be parallel to each other by separately being installed between the lens holder 202 and the damper holders 207, 208.

A plurality of elastic members are required in order to make possible the operation of the plurality of suspension wires 209, 210 supporting not only a translational motion in a tracking direction and a focusing direction but also a tilting motion in a radial direction and a tangential direction of the actuator.

In more detail, because the plurality of suspension wires 209, 210 pull the lens holder 202 from both sides, however it is relatively hard to perform the translational motion and the tilting motion of the lens holder 202, accordingly the plurality of elastic members for facilitating the tilting motion of the lens holder 202 are required for the plurality of suspension wires 209, 210.

As depicted in FIG. 9, the flexible PCB 212 is fixed to the damper holder 207 of the lens holder 202, the center portion of the flexible PCB 212 is fixed to the damper holder 207 by fastening a screw 213, both sides of the flexible PCB 212 are separated from the damper holder so as to be a certain distance, the flexible PCB 212 has a certain elasticity in the separated space.

In the meantime, in the rear left suspension wire 209, the end is fixed to a rear protrusion portion 211 of the lens holder 202, the other end is fixed to the rear of the flexible PCB 212.

Herein, the other end of the front and the rear left suspension wires of the plurality of suspension wires 209, 210 passing through the inward of the damper holder 207 are separately fixed to the flexible PCB 212 by a brazing 214.

Figure 11:
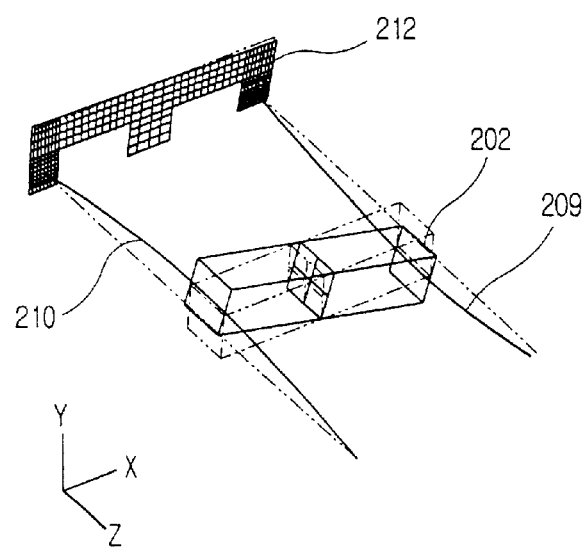
FIG. 11 illustrates a simulation of a radial direction operation of an optical pickup actuator performable a tilting operation in accordance with a first embodiment of the present invention.

Accordingly, as depicted in FIG. 11, because the flexible PCB 212 can move the front and the rear left suspension wires of the plurality of suspension wires 209, 210 by giving a certain elasticity to them, generally the lens holder 202 can move with a freedom.

Figure 12:
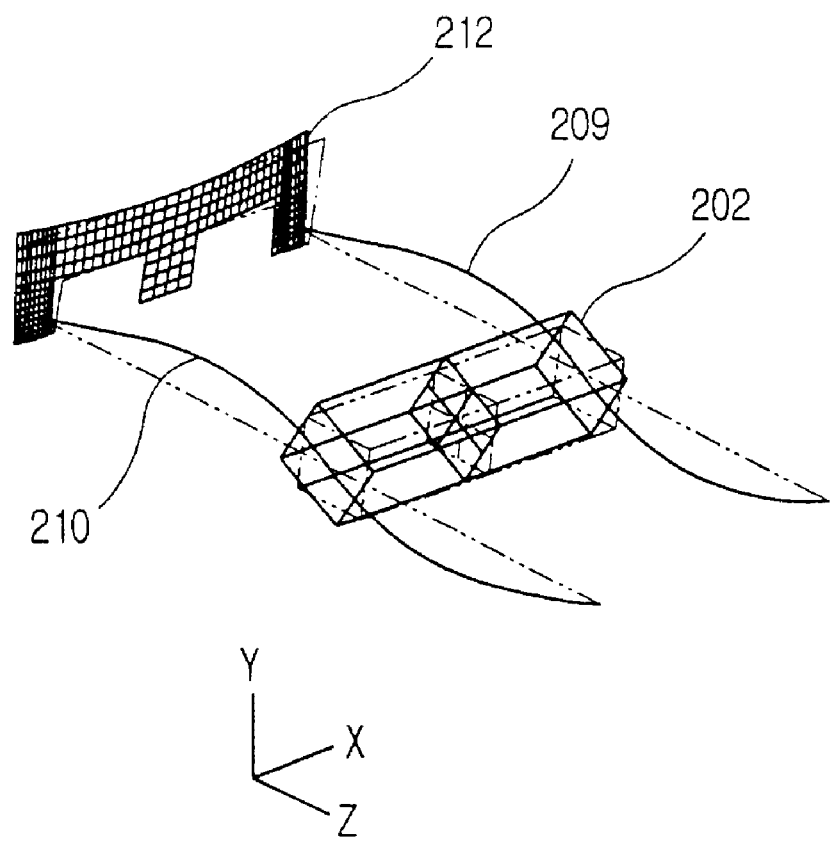
FIG. 12 illustrates a simulation of a tangential direction operation of an optical pickup actuator performable a tilting operation in accordance with a first embodiment of the present invention.

In addition, as depicted in FIG. 12, when the lens holder 202 performs the tilting motion in the tangential direction by the plurality of suspension wires 209, 210, four suspension wires 209, 210 give a maximum degree of freedom to each other while supporting the lens holder 202.

Figure 13A:
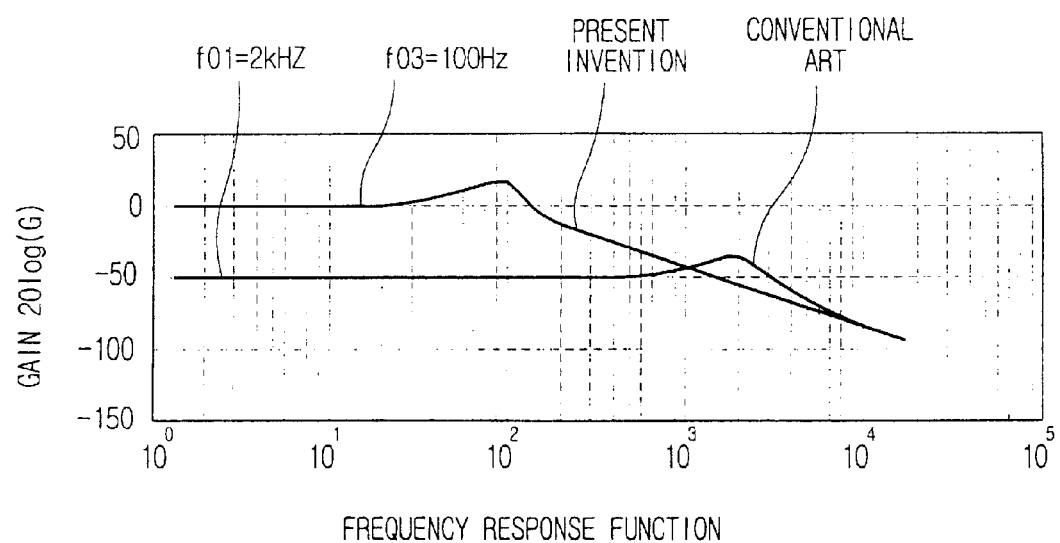
FIG. 13 is a graph illustrating a sensitivity characteristic according to variation of a pitching resonance frequency of an optical pickup actuator performable a tilting operation in accordance with a first embodiment of the present invention and the conventional optical pickup actuator.
Figure 13B:
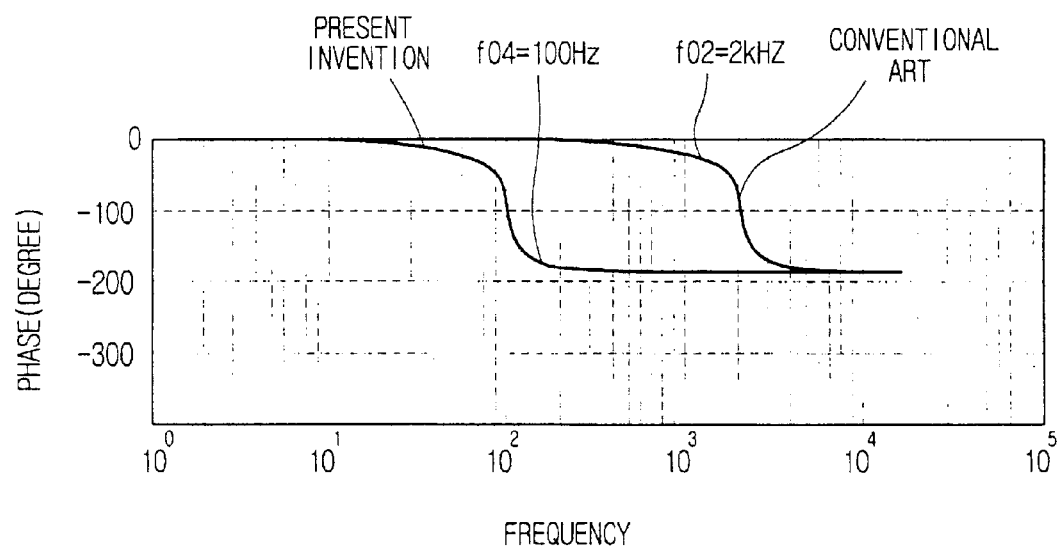

FIGS. 13A and 13B are graphs illustrating a frequency characteristics in the Tangential direction.

Because a resonance frequency of the present invention is lower than a resonance frequency of 2~5 KHz according to the prior art, it is possible to obtain an operating sensitivity.

In more detail, FIGS. 13A and 13B are graphs illustrating a sensitivity characteristic according to variation of a pitching resonance frequency, FIG. 13A is a graph illustrating a gain and a frequency gain, the optical pickup actuator in accordance with the present invention has a gain higher than the conventional optical pickup actuator and has a resonance frequency (f03) lower than the conventional optical pickup actuator (i.e., the conventional optical pickup actuator has a lower gain and a higher resonance frequency (f01)).

And, FIG. 13B is a graph illustrating a phase. FIG. 14 is a graph illustrating a quantity of displacement by an elastic modulus of the flexible PCB 212, the quantity of displacement of the conventional lens holder maintains a linearity, but in the lens holder 202 according to the present a power (N) increases at a certain quantity of displacement.

In the optical pickup actuator performable the tilting operation in accordance with the first embodiment of the present invention, four suspension wires supporting a lens holder having an one-stage structure are installed at a flat surface and are provided an elasticity from a flexible PCB, accordingly the lens holder can perform not only a translational motion in a tracking direction and a focusing direction but also a tilting motion in a radial direction and a tangential direction.

An optical pickup actuator performable a tilting operation in accordance with a second embodiment of the present invention will now be described with reference to accompanying FIGS. 15 and 16.

Figure 15A:
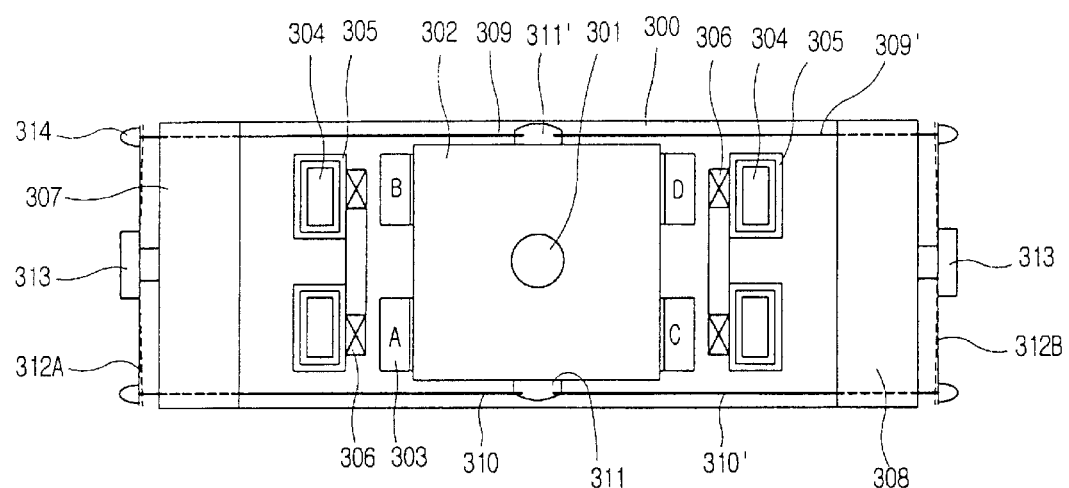
FIG. 15A is a plan view illustrating an optical pickup actuator performable a tilting operation in accordance with a second embodiment of the present invention.
Figure 15B:
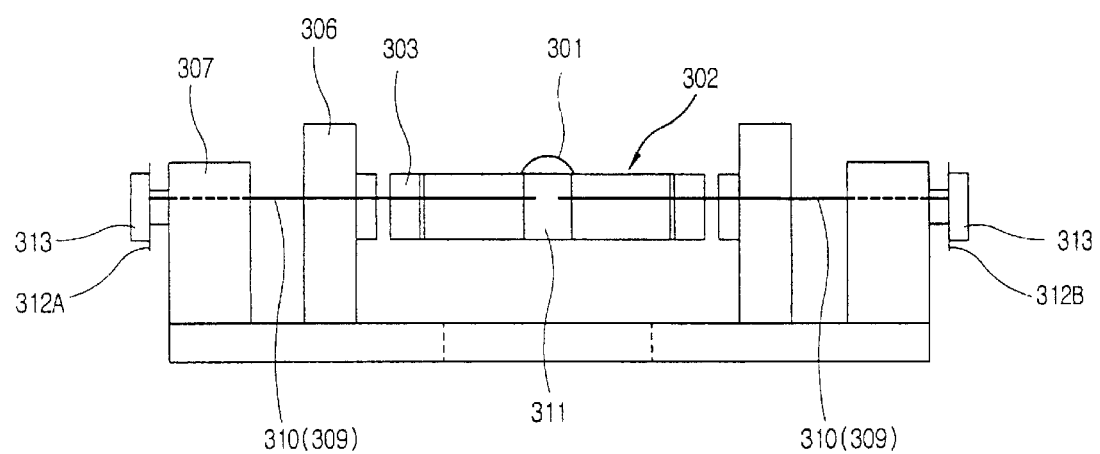
FIG. 15B is a front view illustrating an optical pickup actuator performable a tilting operation in accordance with a first embodiment of the present invention.

FIGS. 15A and 15B are a plan view and a front view illustrating the optical pickup actuator performable the tilting operation in accordance with the second embodiment of the present invention.

In the optical pickup actuator performable the tilting operation in accordance with the second embodiment of the present invention, two flexible PCBs 312A, 312B are separately fixed to two damper holders 307, 308 so as to have a certain distance from each of the damper holders 307, 308 by fastening a screw 313.

In more detail, in the optical pickup actuator performable the tilting operation in accordance with the second embodiment of the present invention, at the right and the left sides of a lens holder 302, two flexible PCBs 312A, 312B are separately fixed to two damper holders 307, 308 by fastening the screw 313, each of a plurality of suspension wires 309, 309', 310, 310' is separately placed between each of two protrusion portions 311 of the lens holder 302 and each of the two flexible PCBs 312A, 312B and fixed by brazing 314.

Herein, one end of the suspension wires 309, 309' is fixed to the rear of each flexible PCB 312A, 312B, the other end of each suspension wire 309, 309' is fixed to a protrusion portion 311' of the lens holder 302. One end of each suspension wire 310, 310' is fixed to the front portion of each flexible PCB 312A, 312B, and the other end of each suspension wire 310, 310' is fixed to a protrusion portion 311 of the lens holder 302.

In the optical pickup actuator performable the tilting operation in accordance with the second embodiment of the present invention, when the lens holder 302 performs not only a translational motion in a tracking direction and a focusing direction but also a tilting motion in a radial direction and a tangential direction, the flexible PCBs 312A, 312B fixed to the damper holders 307, 308 by the screw 313 can move the lens holder 302.

Figure 16A:
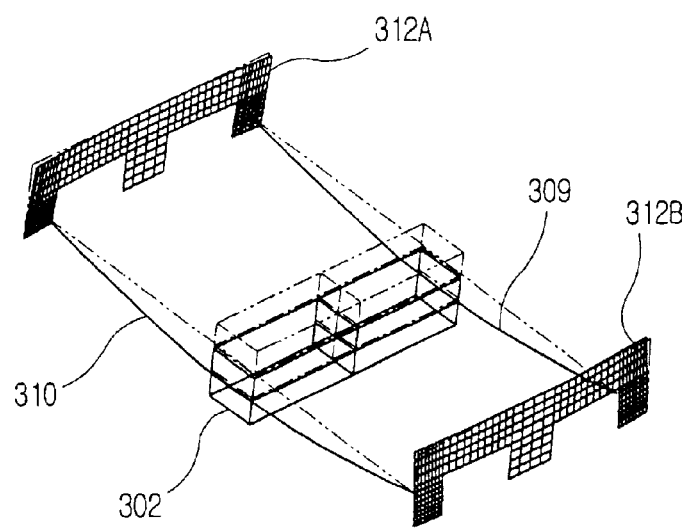
FIG. 16A illustrates a focusing motion mode of the lens holder.
Figure 16B:
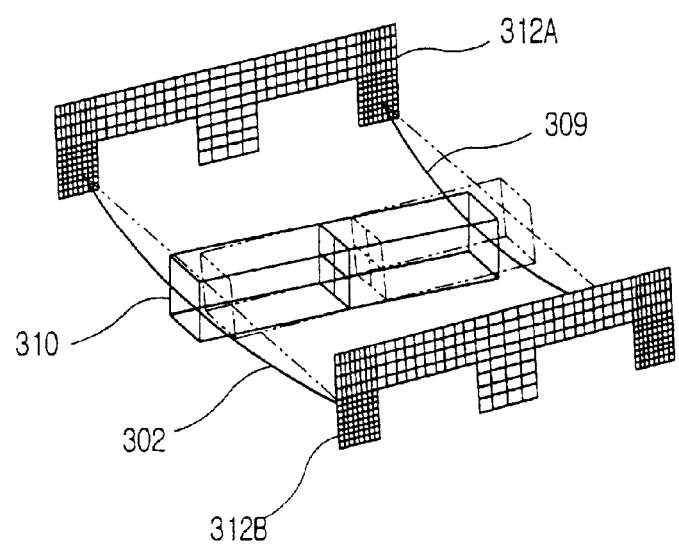
FIG. 16B illustrates a tracking motion mode of the lens holder.
Figure 16C:
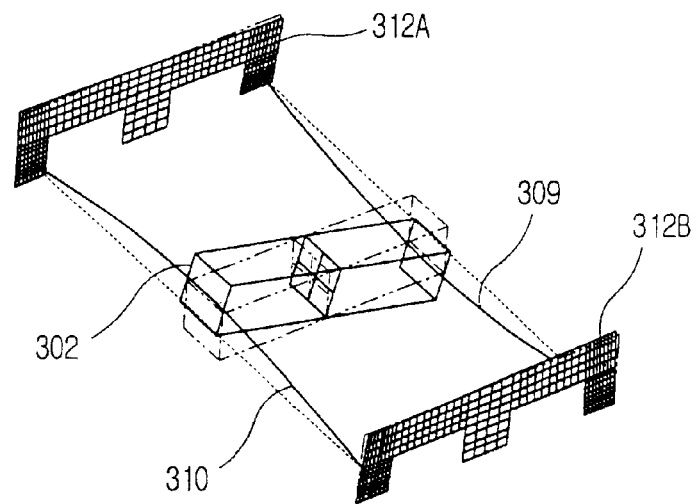
FIG. 16C illustrates a radial motion mode of the lens holder.
Figure 16D:
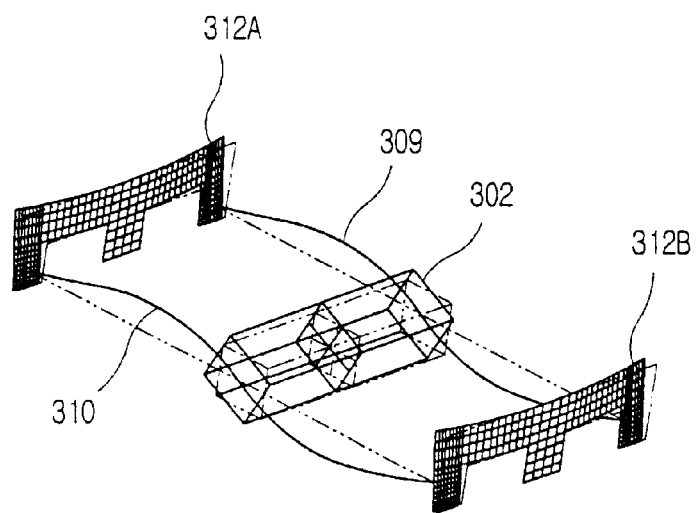
FIG. 16D illustrates a tangential motion mode of the lens holder.

FIG. 16 illustrates a motion mode of a lens holder of an optical pickup actuator performable a tilting operation in accordance with a second embodiment of the present invention, wherein FIG. 16A illustrates a focusing motion mode of the lens holder 302, FIG. 16B illustrates a tracking motion mode of the lens holder 302, FIG. 16C illustrates a radial motion mode of the lens holder 302, and FIG. 16D illustrates a tangential motion mode of the lens holder 302.

In the optical pickup actuator performable the tilting operation in accordance with the second embodiment of the present invention, four suspension wires supporting a lens holder having an one-stage structure are installed at a flat surface and are obtain a moveable range from two flexible PCBs, a constraining force on the lens holder is minimized, accordingly the lens holder can perform not only a translational motion in a tracking direction and a focusing direction but also a tilting motion in a radial direction and a tangential direction.

An optical pickup actuator performable a tilting operation in accordance with a third embodiment of the present invention will now be described with reference to accompanying FIGS. 17.

Figure 17A:
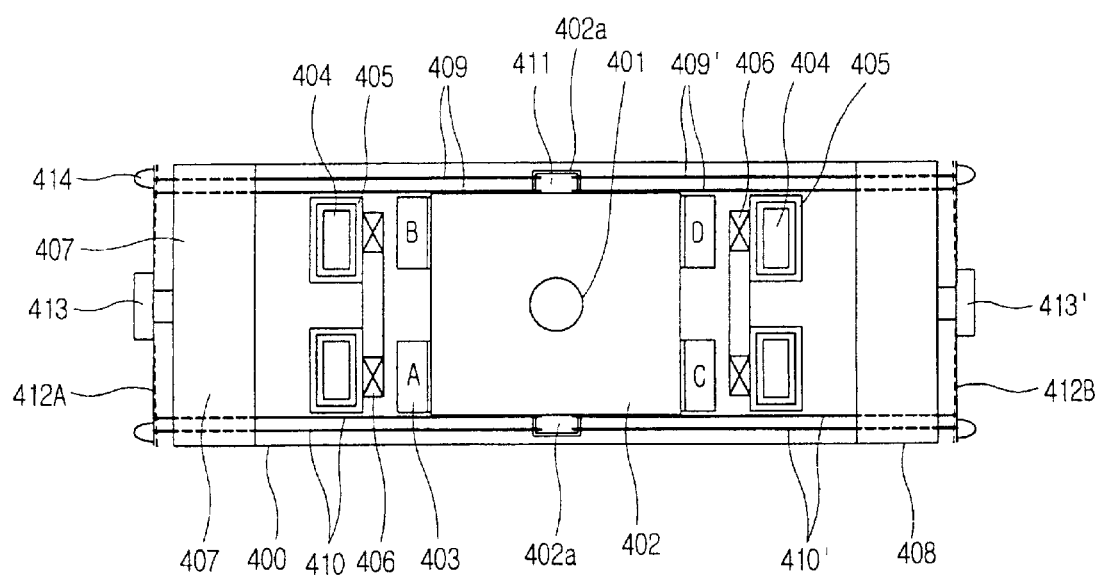
FIG. 17A is a plan view illustrating an optical pickup actuator in accordance with a third embodiment of the present invention.
Figure 17B:
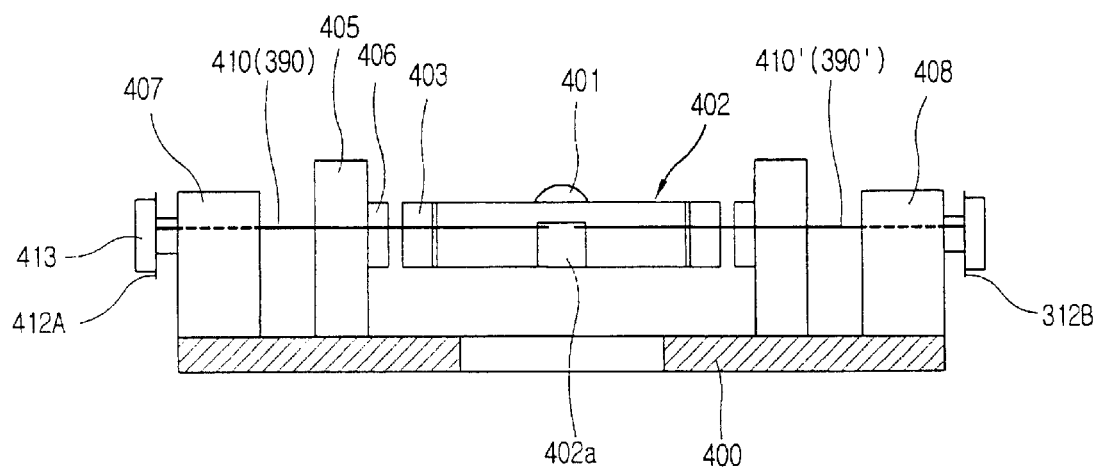
FIG. 17B is a front view illustrating an optical pickup actuator in accordance with a third embodiment of the present invention.

FIGS. 17A and 17B are a plan view and a front view illustrating the optical pickup actuator performable the tilting operation in accordance with the third embodiment of the present invention.

In the optical pickup actuator performable the tilting operation in accordance with the third embodiment of the present invention, each protrusion portion 402a is formed at the front and the rear of a lens holder 402, four pairs of suspension wires 409, 409', 410, 410' (the total of eight suspension wires) are separately connected to the protrusion portions 402a.

In more detail, centering around the lens holder 402, a pair of suspension wires 410 are installed at the front left side, a pair of suspension wires 410' are installed at the front right side, a pair of suspension wires 409 are installed at the rear left side, and a pair of suspension wires 409' are installed at the rear right side so as to have the same height and be parallel with a certain distance.

In the four pairs of suspension wires 409, 409', 410, 410', one end is fixed to one of two protrusion portions 402a of the lens holder 402 by a fixing member 411 and the other end is fixed to one of two flexible PCBs 412A, 412B by brazing 414.

The operation of the optical pickup actuator performable the tilting operation in accordance with the third embodiment of the present invention will now be described.

The four pairs of suspension wires 409, 409', 410, 410' support the lens holder 402, the flexible PCB 412A is connected to a damper holder 407 by a screw 413 so as to have a certain distance from the damper holder 412A and the flexible PCB 412B is connected to a damper holder 408 by a screw 413' so as to have a certain distance from the damper holder 412B.

In the optical pickup actuator performable the tilting operation in accordance with the third embodiment of the present invention, points, which the four pairs of suspension wires 409, 409', 410, 410' are fixed, on the lens holder 402 are rotation center for adjusting a focus of an object lens 401, the four pairs of suspension wires 409, 409', 410, 410' are fixed to the front and the rear of the rotation center so as to be parallel.

In the optical pickup actuator performable the tilting operation in accordance with the third embodiment of the present invention, the total of eight suspension wires supporting a lens holder are installed on a flat surface as one-stage structure and are supplied a moveable range by deformation of each flexible PCB placed at both sides, accordingly the lens holder can perform not only a translational motion in a tracking direction and a focusing direction but also a tilting motion in a radial direction and a tangential direction.

An optical pickup actuator performable a tilting operation in accordance with a fourth embodiment of the present invention will now be described with reference to accompanying FIGS. 18, 19, 20 and 21.

Figure 18:
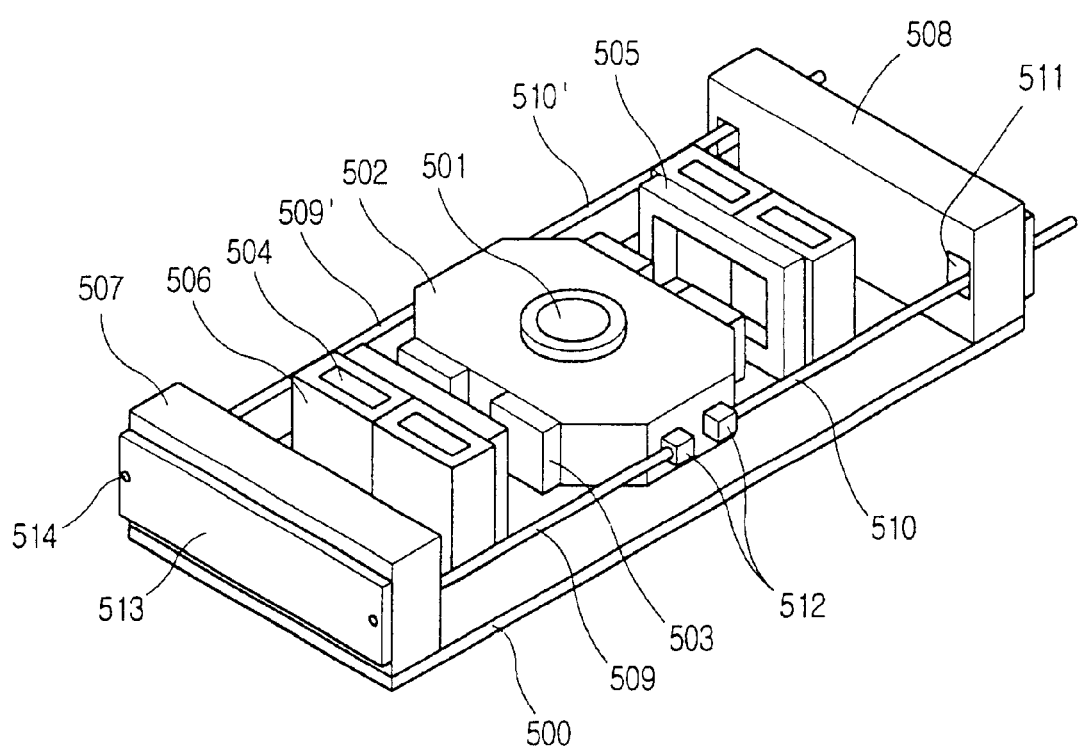
FIG. 18 is a perspective view illustrating an optical pickup actuator performable a tilting operation in accordance with a fourth embodiment of the present invention.
Figure 19:
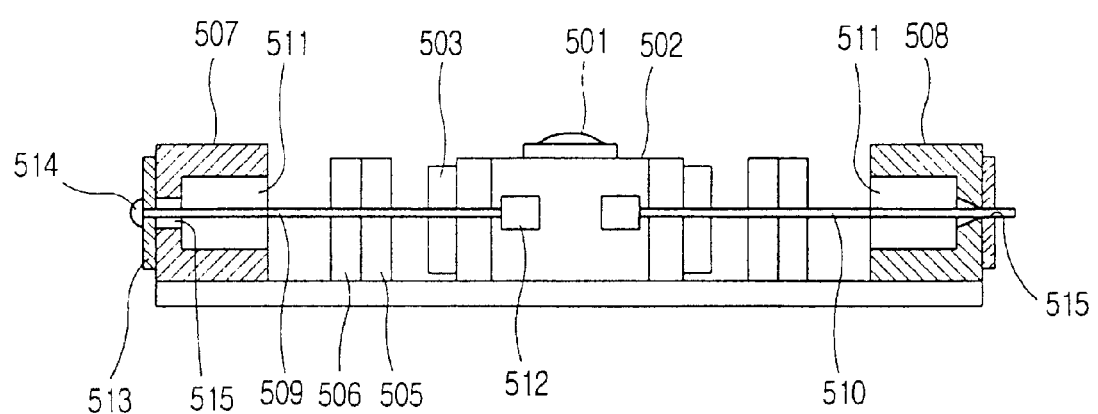
FIG. 19 is a front sectional view illustrating an optical pickup actuator performable a tilting operation in accordance with a fourth embodiment of the present invention.

FIG. 18 is a perspective view illustrating the optical pickup actuator performable the tilting operation in accordance with the fourth embodiment of the present invention, and FIG. 19 is a front sectional view illustrating the optical pickup actuator performable the tilting operation in accordance with the fourth embodiment of the present invention.

The optical pickup actuator performable the tilting operation in accordance with the fourth embodiment of the present invention includes a lens holder 502 having an objective lens 501 at the center portion and a plurality of magnets 503 separately installed at the right and the left sides, a plurality of yokes 504 separately placed on the right and the left sides of the lens holder 502 and having a focusing coil 505 divided into four pieces and a pair of tracking coils 506, a plurality of damper holders 507, 507 separately installed at both ends of a base 500 and having a plurality of damper holes 511, and four suspension wires 509, 510 separately placed between each of the plurality of damper holders 507, 508 with the lens holder 502.

Herein, the focusing coil 505 divided into four pieces and a pair of the tracking coils 506 are in interaction with the plurality of magnets 503, by controlling a current ratio applied to the focusing coil 505, the lens holder 502 can perform a motion in the radial direction and the tangential direction.

Each of the plurality of damper holes 511 is installed on each of the plurality of damper holders 507, 508 in order to pass each of the four suspension wires 509, 509', 510, 510' and at the same time have an attenuation characteristic.

Two 510, 510' of the four suspension wires 509, 509', 510, 510' are separately placed at the right side of the lens holder 502 and the rest two 509. 509' of the four suspension wires 509, 509', 510, 510' are placed at the left side of the lens holder 502 so as to be parallel each other in order to support the lens holder 502.

One end of each of the left suspension wires 509, 509' is fixed to the left flexible PCB 513 through each of the plurality of damper holes 511 of the left damper holder 507 by brazing 514, and the other end of each of the left suspension wires 509, 509' is fixed to each of the plurality of protrusion portions 512 formed at the lens holder 502.

One end of each of the right suspension wires 510, 510' is inserted into each of the plurality of insertion holes 515 through each damper hole 511 of the right damper holder 508, and the other end of each of the right suspension wires 510, 510' is fixed to each of the plurality of protrusion portions 512 formed at the lens holder 512.

Accordingly, the left suspension wires 509, 509' are fixed to the left flexible PCB 513 by a brazing, and the right suspension wires 510, 510' are inserted into both insertion holes 515. Herein, although the right suspension wires 510, 510' are not fixed, because they have a certain stiffness, they can be placed so as to be parallel each other.

By the support structure of the plurality of suspension wires 509, 509', 510, 510', the lens holder 502 can have an operation freedom in performing not only a translational motion in a tracking direction and a focusing direction but also a tilting motion in a radial direction and a tangential direction.

Figure 20A:
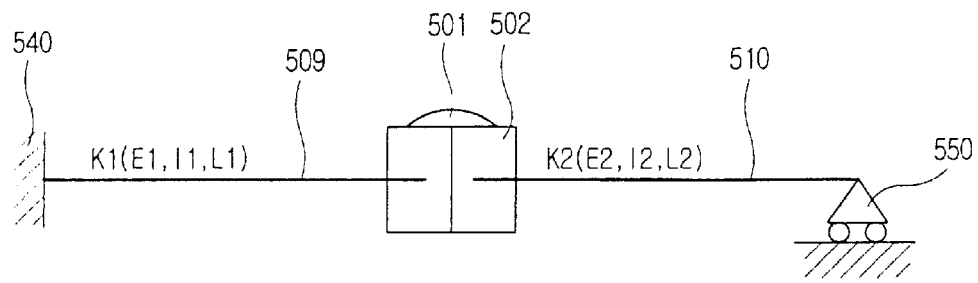
FIG. 20A is a reference view illustrating a basic support structure of a suspension wire in an optical pickup actuator performable a tilting operation in accordance with a fourth embodiment of the present invention.
Figure 20B:
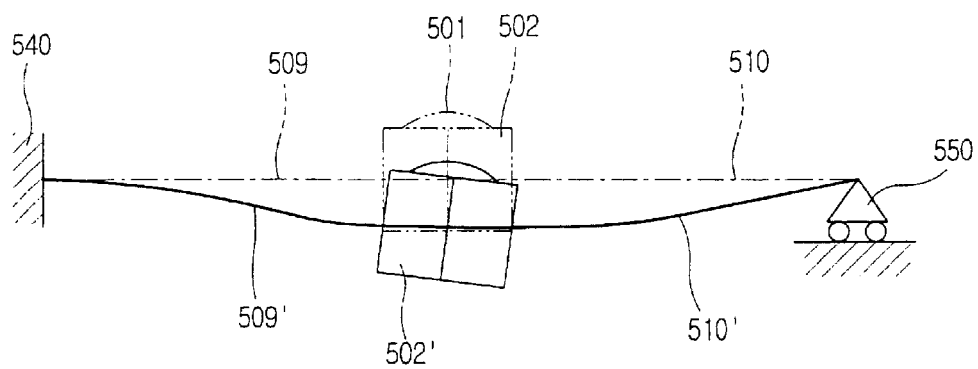
FIG. 20B is a reference view illustrating a focusing motion when a spring constant of each suspension wire placed on the right side and the left side of a lens holder is different each other.
Figure 20C:
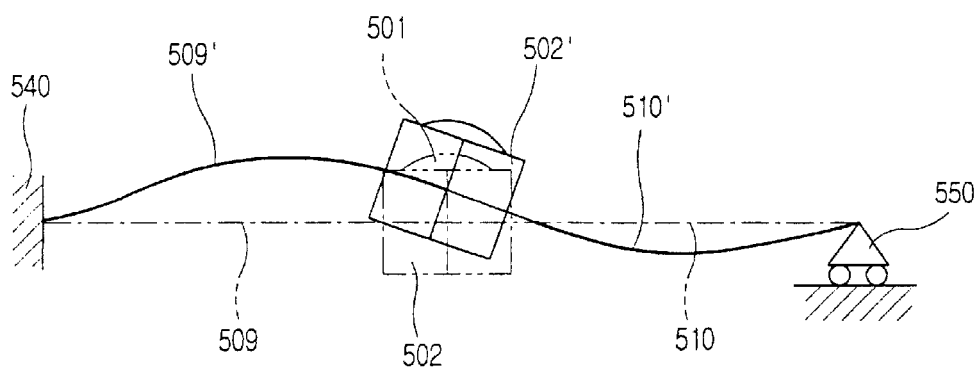
FIG. 20C is a reference view illustrating a tangential tilt motion when a spring constant of each suspension wire placed on the right side and the left side of a lens holder is different each other.

FIG. 20A is a reference view illustrating a basic support structure of a suspension wire in an optical pickup actuator performable a tilting operation in accordance with a first embodiment of the present invention, FIG. 20B is a reference view illustrating a focusing motion when each suspension wire placed on the right side and the left side of a lens holder is used as the same and FIG. 20C is a reference view illustrating a tangential tilt motion when each suspension wire placed on the right side and the left side of a lens holder is used as the same.

As depicted in FIG. 20, when a left suspension wire 509 is fixed to a fixed end 540 and a right suspension wire 510 is not fixed to a free end 550, fixation methods of the left and the right suspension wires 509, 510 are different from each other, in the use of the same suspension wire, a constant value K1 of the left suspension wire 509 is different from a constant value K2 of the right suspension wire 510. And, due to the difference in the spring constants K1, K2, a lens holder cannot perform the motion sufficiently.

In more detail, as depicted in FIG. 20A, when each spring constant of each of the plurality of suspension wires 509, 509', 510, 510' is K1=f (E1, I1, L1), K2=f (E2, I2, L2) and E1=E2, I1=I2, L1=L2, as depicted in FIG. 20B, when the lens holder 502 operates in a focusing direction, the suspension wires 509', 510' have different spring constants (K1≠K2), a tilt occurs in the focusing operation, as depicted in FIG. 20C, the suspension wires 509', 510' have different spring constants (K1≠K2) in the tangential tilt operation, accordingly a coupling phenomenon causing a focusing displacement occurs in the tilt operation.

The binary phenomenon occurs because different fixation method is adopted in both ends (the fixed end and the free end).

Herein, the spring constant K1 of the left suspension wire 509 of the fixed end 540 and the spring constant K2 of the right suspension wire 510 of the free end 550 are influenced by an elastic modulus of each wire (E1, E1), an inertia moment I1, I2 and a length (L1, L2).

The above-mentioned problem occurs due to the difference of the spring constant of the left and right suspension wires 509, 510, when the spring constant of both sides are same, the binary phenomenon does not occur in the translational motion or the tilting motion.

Figure 21A:
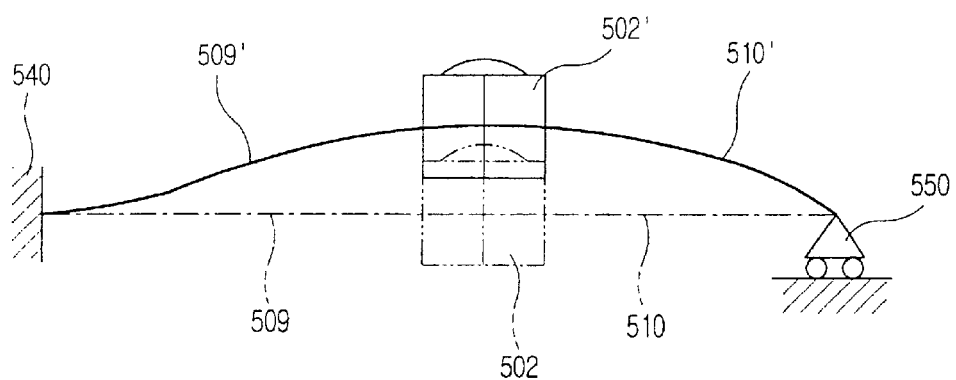
FIG. 21A illustrates a focusing motion when a spring constant of each suspension wire placed on the right side and the left side of a lens holder is the same in the fourth embodiment of the present invention.

On the contrary, in FIG. 21, the spring constant K1 is same as the spring constant K2 by adjusting a length L1, L2 of suspension wires 509, 510. In FIG. 21A, when the lens holder 502 moves in a focusing direction, the left suspension wire 509 and the right suspension wire 510 support the lens holder 502 with the same spring constant, accordingly the tilt motion does not occur.

Figure 21B:
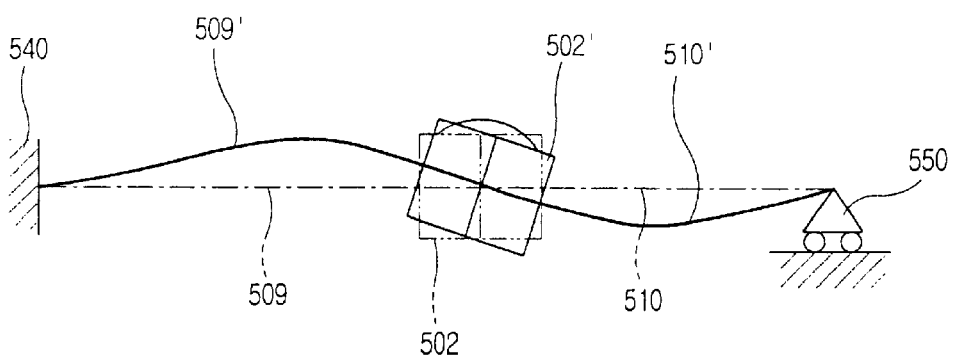
FIG. 21B illustrates a tangential tilt motion when a spring constant of each suspension wire placed on the right side and the left side of a lens holder is the same in the fourth embodiment of the present invention.

In addition, displacement in a focusing direction does not occur in the tangential tilt operation as depicted in FIG. 21B.

When the left side of each of the suspension wires 509, 510 is the fixed end 540 and the right side of each of the suspension wires 509, 510 is the free end 550, independent operation of the lens holder 502 about each direction centering around the center of an object lens can be performed by adjusting a spring constant of the suspension wires 509, 510.

Herein, the spring constant of the fixed end 540 is greater than the spring constant of the free end 550 (K1>K2), in order to get both the spring constants be same, an elastic modulus E2 of the right suspension wire fixed to the free end 550 has to be greater than an elastic modulus E1 of the left suspension wire 509 fixed to the fixed end 540 or an inertia moment I2 of the left suspension wire 509 has to be larger than an inertia moment I1 of the right suspension wire 510 or a length L1 of the left suspension wire 509 is longer than a length L2 of the right suspension wire 510.

In addition, by adjusting the elastic modulus, the inertia moment and the length, the spring constant K1 of the left suspension wire 509 can be same as the spring constant K of the right suspension wire 510.

And, a ratio for satisfying the conditions of the spring constant (K1=K2) can be described as L1/L2=1.45, I2/I2=1.22, E2/E1=2.33, under the above-mentioned condition, the suspension wires 509, 510 having the same spring constant can be installed.

Herein, when a support member is constructed with a wire such as a suspension wire, the inertia moment can be described as $$I = \frac{pr^4}{4} \ (r = \text{radius}),$$

when a support member is constructed with a plate spring, the inertia moment can be described as $$I = \frac{bh^3}{12} \ (b = \text{breadth}, h = \text{height}).$$

As described above, in the optical pickup actuator performable the tilting operation in accordance with the fourth embodiment of the present invention, in four suspension wires installed on a flat surface as one-stage structure in order to support a lens holder, one end is fixed end and the other end is free end and both ends have the same spring constant, accordingly a tilting motion can be performed by lowering a stiffness in a tilting direction (particularly, a tangential direction) so as to have a sufficient operating force without changing a stiffness of a translational motion.

An optical pickup actuator performable a tilting operation in accordance with a fifth embodiment of the present invention will now be described with reference to accompanying FIG. 22.

Figure 22:
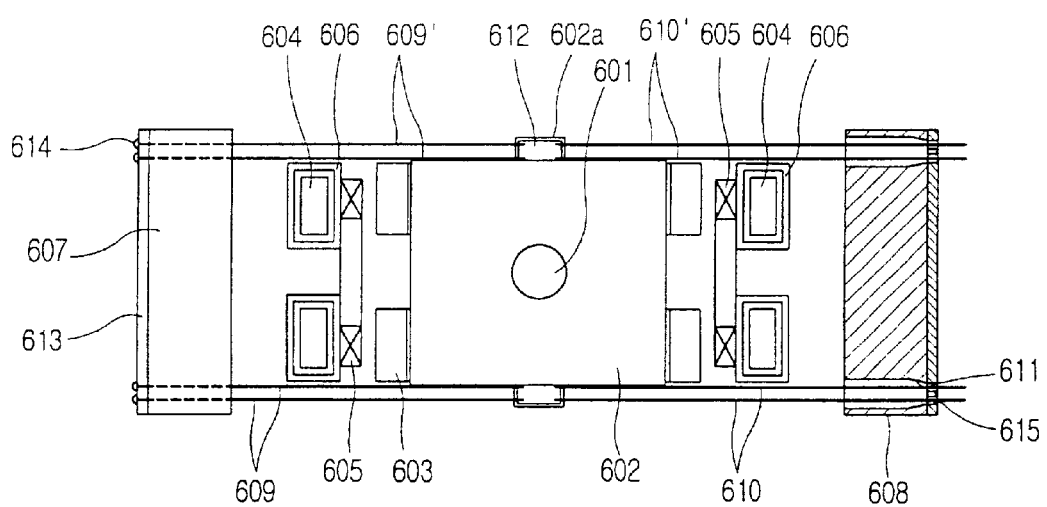
FIG. 22 is a plan view illustrating an optical pickup actuator performable a tilting operation in accordance with a fifth embodiment of the present invention.

FIG. 22 is a plan view illustrating an optical pickup actuator performable a tilting operation in accordance with a fifth embodiment of the present invention.

The optical pickup actuator performable the tilting operation in accordance with the fifth embodiment of the present invention includes a lens holder 602 having two protrusion portions 602a installed separately at the front and the rear in order to install a fixing member 612, damper holders 607, 608, and four pairs of suspension wires 609, 610 having an one-stage structure placed between the damper holders 607, 608 and the lens holder 602.

In more detail, an object lens 601 is placed on the center portion of the lens holder 602, a plurality of magnets 603 are separately installed at the left and the right sides of the lens holder 602, each protrusion portion 602a is formed at the front and the rear of the lens holder 602, the fixing member 612 is installed at each protrusion portion 602a, the four pairs of suspension wires 609, 610 are installed from the fixing member 612 to each damper holder 607, 608.

Herein, one end of each of the left suspension wires 609, 609' is fixed to the left flexible PCB 613 by a brazing 614, and one end of each of the right suspension wires 510, 510' is inserted into each of the plurality of insertion holes 615 through each damper hole 611 of the right damper holder 608, the four pairs of suspension wires are installed on one flat surface so as to be parallel each other.

Herein, the end of the left suspension wire 609 is a fixed end, and the end of the suspension wire 610 is a free end.

The operation of the optical pickup actuator performable the tilting operation in accordance with the fifth embodiment of the present invention, when the four pairs of suspension wires 609, 610 have the same spring constant by above-mentioned conditions in the translational motion and the tilt motion of the lens holder 602, the lens holder 602 can perform each independent motion in the focusing and tangential tilt operation.

As described above, in the optical pickup actuator performable the tilting operation in accordance with the fifth embodiment of the present invention, in eight suspension wires installed on a flat surface as one-stage structure in order to support a lens holder, one end is a fixed end and the other end is a free end and both ends have the same spring constant, accordingly a tilting motion can be performed by lowering a stiffness in a tilting direction (particularly, a tangential direction) so as to have a sufficient operating force without changing a stiffness of a translational motion.

In addition, in the optical pickup actuator performable the tilting operation in accordance with the fifth embodiment of the present invention, by including eight suspension wires on a flat surface, it is possible to facilitate power supply to an electromagnetic field for motion of a lens holder in each direction such as a focusing, a tracking, a radial, a tangential, etc.

An optical pickup actuator performable a tilting operation in accordance with a sixth embodiment of the present invention will now be described with reference to accompanying FIGS. 23~28.

Figure 23:
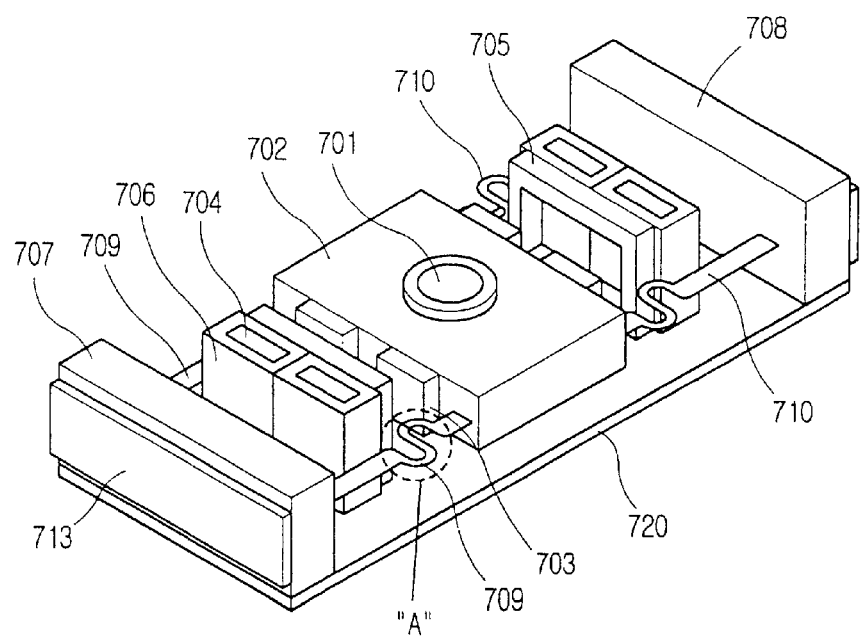
FIG. 23 is a perspective view illustrating an optical pickup actuator performable a tilting operation in accordance with a sixth embodiment of the present invention.
Figure 24:
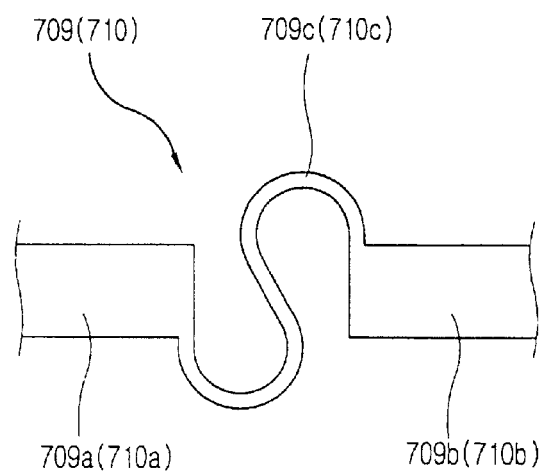
FIG. 24 is a detailed view illustrating "A" portion of FIG. 23.

FIG. 23 is a perspective view illustrating an optical pickup actuator performable a tilting operation in accordance with a sixth embodiment of the present invention, and FIG. 24 is a detailed view illustrating "A" portion of FIG. 23.

An optical pickup actuator performable a tilting operation in accordance with a sixth embodiment of the present invention includes a lens holder 702 having an objective lens 701 at the center portion and a plurality of magnets 703 separately installed at the right and the left sides, a plurality of yokes 704 separately placed on the right and the left sides of the lens holder 702 and having a focusing coil 705 and a tracking coil 706, two damper holders 707, 708 separately installed at both ends of a base 720, a pair of first elastic support members 709 placed between the damper holder 707 and the lens holder 702 and a pair of second elastic support members 710 placed between the damper holder 708 and the lens holder 702.

Particularly, one end of each first elastic support member 709 is fixed to the flexible PCB 713 installed at the left damper holder 707, the other end of each first elastic support member 709 is fixed to the lens holder 702, and one end of each second elastic support member 710 is fixed to the flexible PCB 713 installed at the right damper holder 708, the other end of each second elastic support member 710 is fixed to the lens holder 702.

The first and the second elastic support members 709, 710 are conductive plate springs include a first support portion 709a, 710a, a second support portion 709b, 710b connected to the lens holder 702 and a S-shaped elastic portion 709c, herein 710c is press-fabricated between the first support portion 709a, 710a and the second support portion 709b, 710b.

Accordingly, the lens holder 702 can move in a tracking direction, a focusing direction, a tangential direction and a radial direction by receiving a movement freedom from the second support portion 709b, 710b according to deformation of the elastic portion 709c, 710c centering around the first support portion 709a, 710a of the first and the second elastic support members 709, 710.

FIGS. 25~28 illustrate each motion of an actuator in accordance with the sixth embodiment of the present invention.

Figure 25A:
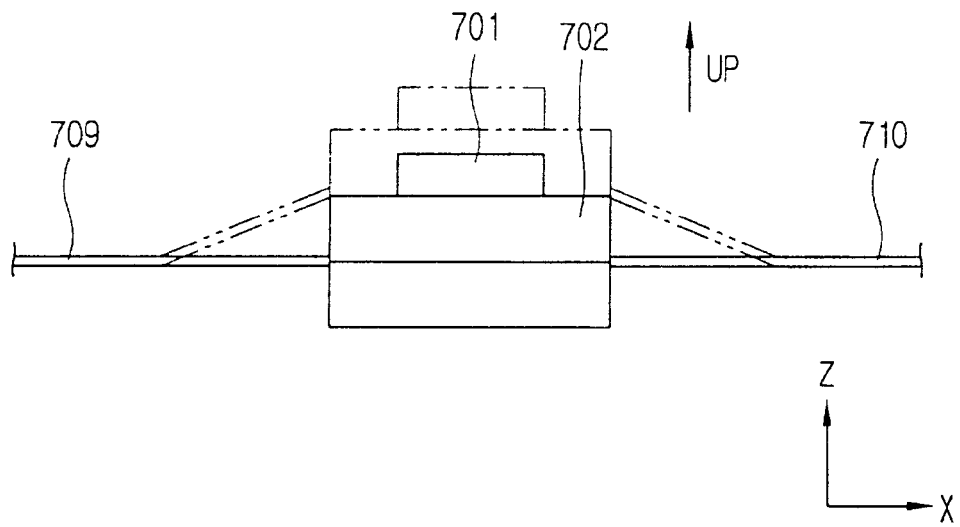
FIGS. 25A and 25B are front views illustrating a focusing motion of a lens holder in the sixth embodiment of the present invention.
Figure 25B:
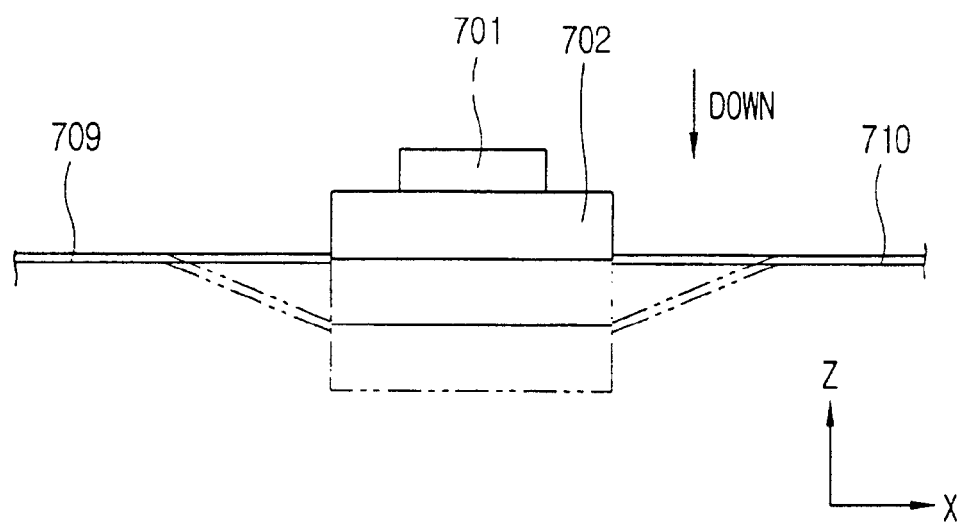
Figure 26A:
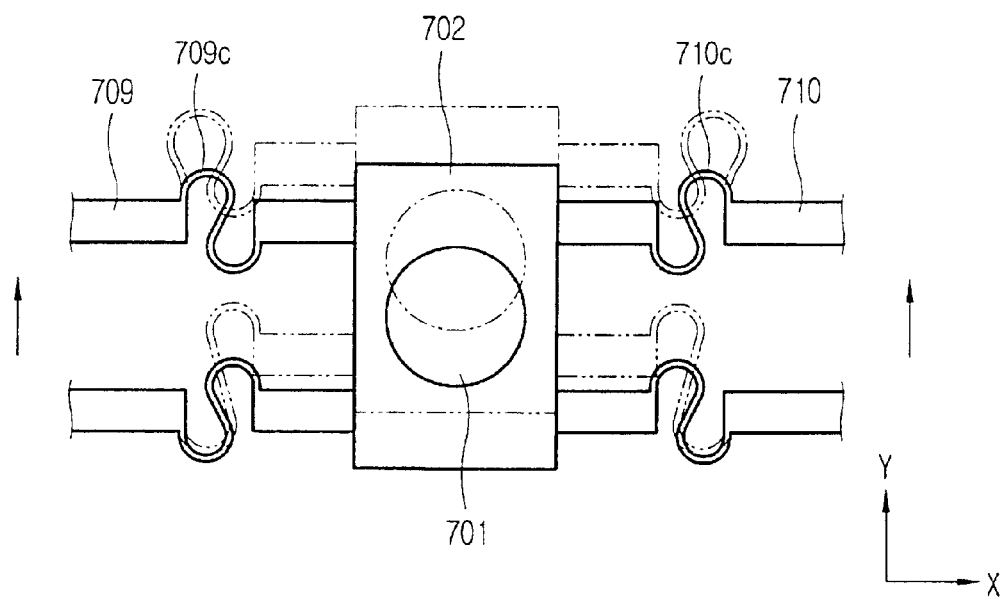
FIGS. 26A and 26B are plan views illustrating a tracking motion of a lens holder in the sixth embodiment of the present invention.
Figure 26B:
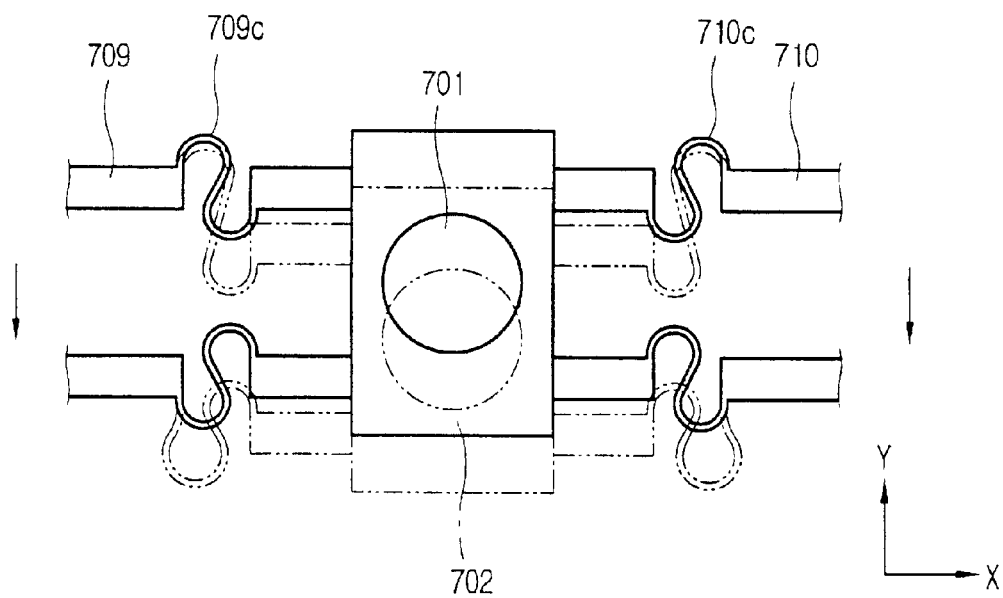

FIGS. 25A and 25B are front views illustrating a focusing motion (z axis direction; up and down) of a lens holder 702 in the sixth embodiment of the present invention, and FIGS. 26A and 26B are plan views illustrating a tracking motion (Y axis direction) of a lens holder 702 in the sixth embodiment of the present invention.

Figure 27A:
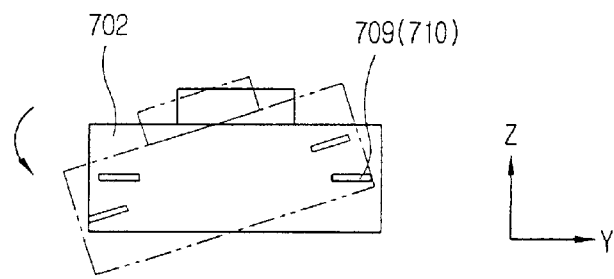
FIGS. 27A and 27B are side views illustrating a tilting motion in a radial direction of the lens holder in the sixth embodiment of the present invention.
Figure 27B:
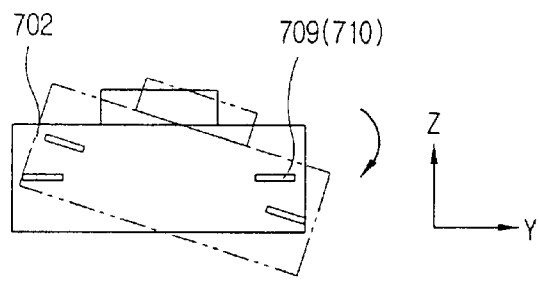
Figure 28A:
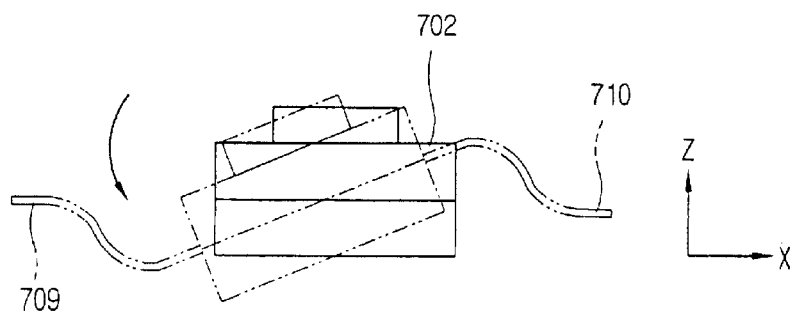
Figure 28A:
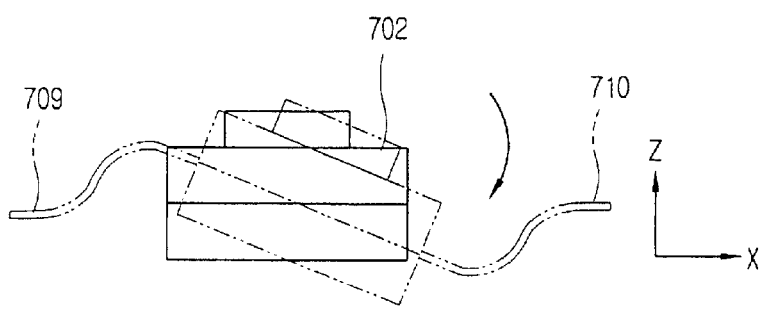

FIGS. 27A and 27B are side views illustrating a tilting motion in a radial direction of the lens holder 702 in the sixth embodiment of the present invention, and FIGS. 28A and 28B are front views illustrating a tilting motion in a tangential direction of the lens holder 702 in the sixth embodiment of the present invention.

When the lens holder 702 operates by the movement freedom as depicted in FIGS. 25~28, the elastic portion 709c, 710c of the first and the second elastic support members 709, 710 are deformed and stretched, and contracted and restored after the operation end.

In the optical pickup actuator performable the tilting operation in accordance with the sixth embodiment of the present invention, four elastic support members are placed on one flat surface in order to support both sides of a lens holder and include a 'S'-shaped elastic portion, accordingly the optical pickup actuator can perform not only a translational motion in a tracking direction and a focusing direction but also a tilting motion in a radial direction and a tangential direction, accordingly data recorded on a high density disc can be access more accurately.

An optical pickup actuator performable a tilting operation in accordance with a seventh embodiment of the present invention will now be described with reference to accompanying FIG. 29.

Figure 29:
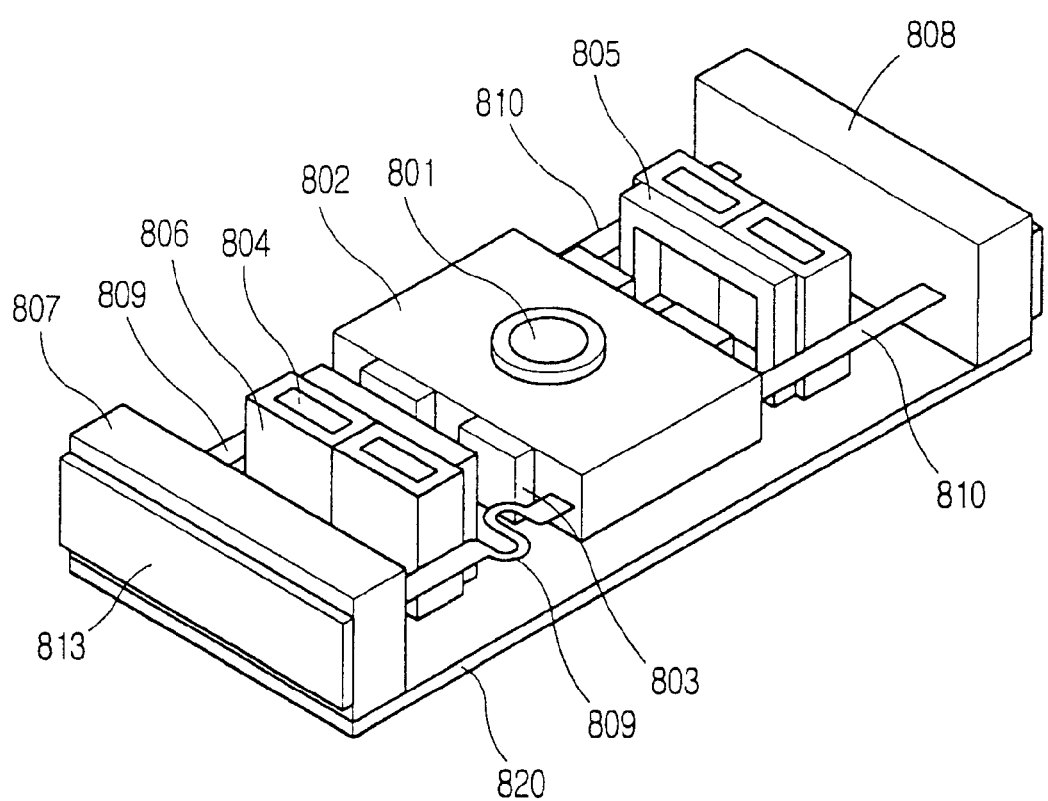
FIG. 29 is a perspective view illustrating an optical pickup actuator performable a tilting operation in accordance with a seventh embodiment of the present invention.

FIG. 29 is a perspective view illustrating an optical pickup actuator performable a tilting operation in accordance with a seventh embodiment of the present invention.

In the optical pickup actuator performable a tilting operation in accordance with the seventh embodiment of the present invention, operation of a lens holder for performing each motion by constructing a magnetic circuit with magnets and coils is the same with the operation of the sixth embodiment.

Particularly, in the optical pickup actuator performable a tilting operation in accordance with the seventh embodiment of the present invention, a first elastic support member connected between the left side of a lens holder 802 and a damper holder 807 of the lens holder 802 has an elastic portion same as the sixth embodiment, and a second elastic support member 810 connected between the other side of the lens holder 802 and the other damper holder 808 of the lens holder 802 does not have an elastic portion.

In the above-mentioned structure, in operation of the lens holder 802, the elastic portion of the first elastic support member 809 can have sufficient movement freedom about all movement of the lens holder 802, accordingly the lens holder can perform not only a translational motion in a tracking direction and a focusing direction but also a tilting motion in a radial direction and a tangential direction.

In the optical pickup actuator performable a tilting operation in accordance with the seventh embodiment of the present invention, four elastic support members are installed on one flat surface so as to support both sides of a lens holder, the elastic support member placed at one side has a 'S'-shaped elastic portion, the lens holder can perform not only a translational motion in a tracking direction and a focusing direction but also a tilting motion in a radial direction and a tangential direction, accordingly data recorded on a high density disc can be access more accurately.

What is claimed is:

1. An optical pickup actuator operated in a structure where a lens holding means with an object lens thereon is supported by a supporting means at both sides of said lens holding means, comprising:

a fixed body having a first end and a second end; and a pair of supporting means are extended between both ends of said fixed body and at both sides of said lens holding means, wherein at least one of said supporting means is secured to an elastic plate located adjacent to one end of the fixed body.

2. The actuator of claim 1, wherein said supporting means are made of a plate spring.

3. The actuator of claim 1, wherein said supporting means are made of a wire spring.

4. An optical pickup actuator, comprising:

two damper holders separately fixed to both sides of a base;

a lens holder placed between the damper holders and having an object lens in order to read and write information of an optical disc;

multiple suspension wires separately connecting the damper holder with the lens holder; and two magnetic operating means separately installed at the lens holder and the base and operating the lens holder so as to follow an optical disc;

wherein a flexible plate is placed at the outside of the damper holder in order to transmit an operating signal to the magnetic operating means, its center portion is fixed to the damper holder so as to have a certain distance from the damper holder in order to transmit an operation signal to the magnetic operating means.

5. The actuator of claim 4, wherein one end of the suspension wires is fixed to the damper holder, and another end of the suspension wires is supported by the other damper holder so as to be movable in a length direction.

6. The actuator of claim 4, wherein each suspension wire is constructed with a plate spring, and an elastic portion having an "S" shape.

7. An optical pickup apparatus, comprising:

a frame;

first elastic members connected to a first side of said frame;

second elastic members connected to a second side of said frame; and a lens holder connected with said frame via said first and second elastic members, wherein at least one side of said frame is flexible.

8. The apparatus of claim 7, wherein the first side of said frame is flexible compared to the second side of said frame.

9. The apparatus of claim 8, wherein the first side of said frame comprises:

a damper holder; and a flexible plate connected to the damper holder with a clearance therebetween, wherein said first elastic members pass through the damper holder and are attached to said flexible plate.

10. The apparatus of claim 7, wherein both the first and second sides of said frame are flexible.

11. The apparatus of claim 10, wherein each side of said frame comprises:

a damper holder, and a flexible plate connected to the damper holder with a clearance therebetween, wherein said elastic members pass through the damper holder and are attached to said flexible plate.

12. The apparatus of claim 7, further comprising:

a magnetic unit attached to said lens holder, and a driving coil unit cooperating with said magnetic unit when magnetic fields are formed therebetween, wherein said elastic members connected with said frame having at least one side being flexible to allow said lens holder to move in various directions due to said driving coil unit cooperating with said magnetic unit.

13. The apparatus of claim 12, wherein the various directions include a tracking direction, a focusing direction, and tilting in a radial direction and a tangential direction.

* * * * *